US012619818B2

(12) United States Patent
Nichols et al.

(10) Patent No.: US 12,619,818 B2
(45) Date of Patent: May 5, 2026

(54) GENERATING AND VALIDATING DATA INSIGHTS USING MACHINE LEARNING MODELS

(71) Applicant: Salesforce, Inc., San Francisco, CA (US)

(72) Inventors: Nathan Drew Nichols, Chicago, IL (US); Hon Hing Wang, Seattle, WA (US); Caroline Sherman, San Francisco, CA (US); Lara Thompson, Vancouver (CA); Jonathan Alden Drake, San Francisco, CA (US); Ian Arthur Booth, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 280 days.

(21) Appl. No.: 18/429,132

(22) Filed: Jan. 31, 2024

(65) Prior Publication Data

US 2025/0086385 A1     Mar. 13, 2025

Related U.S. Application Data

(60) Provisional application No. 63/537,808, filed on Sep. 11, 2023.

(51) Int. Cl.
*G06F 40/20* (2020.01)
*G06F 16/383* (2019.01)
*G06N 3/0455* (2023.01)

(52) U.S. Cl.
CPC ............ *G06F 40/20* (2020.01); *G06F 16/383* (2019.01); *G06N 3/0455* (2023.01)

(58) Field of Classification Search
CPC .... G06F 16/685; G06F 16/686; G06F 16/345; G06F 40/284; G06F 40/295; G06F 40/20; G06F 16/383; G06N 3/0455
See application file for complete search history.

(56) References Cited

U.S. PATENT DOCUMENTS

| | | | | |
|---|---|---|---|---|
| 10,573,312 | B1 * | 2/2020 | Thomson | G10L 15/22 |
| 11,182,748 | B1 * | 11/2021 | Neckermann | G06N 5/022 |
| 2012/0210203 | A1 * | 8/2012 | Kandekar | G06F 16/345 |
| | | | | 715/230 |
| 2015/0195406 | A1 * | 7/2015 | Dwyer | G06F 21/6254 |
| | | | | 379/265.07 |
| 2018/0061256 | A1 * | 3/2018 | Elchik | G09B 5/02 |
| 2019/0205726 | A1 | 7/2019 | Khabiri et al. | |
| 2019/0245972 | A1 * | 8/2019 | Dwyer | G10L 15/26 |

(Continued)

FOREIGN PATENT DOCUMENTS

| | | | | | |
|---|---|---|---|---|---|
| CA | 2744744 | A1 * | 1/2012 | | G11B 27/28 |
| CA | 3052862 | A1 * | 2/2020 | | G06Q 40/12 |

(Continued)

OTHER PUBLICATIONS

Salesforce, Inc., International Search Report and Written Opinion, PCT/US2024/046262, Feb. 3, 2025, 17 pgs.

*Primary Examiner* — Mohammad K Islam
(74) *Attorney, Agent, or Firm* — Morgan, Lewis & Bockius LLP

(57) ABSTRACT

A system obtains a bundle of insights generated based on insight templates and provides the bundle of insights as input to a machine learning model. The system then generates a summary of the bundle of insights using the machine learning model.

12 Claims, 15 Drawing Sheets

(56) References Cited

U.S. PATENT DOCUMENTS

| | | | | |
|---|---|---|---|---|
| 2021/0342361 A1 * | 11/2021 | Radzewsky | G06F 16/23 | |
| 2022/0138697 A1 * | 5/2022 | Neckermann | G06N 5/02 | |
| | | | | 709/204 |
| 2023/0179709 A1 * | 6/2023 | Dwyer | G10L 15/30 | |
| | | | | 379/265.03 |
| 2023/0230589 A1 * | 7/2023 | Giovanardi | G06F 40/279 | |
| | | | | 704/232 |
| 2023/0315987 A1 * | 10/2023 | Shires | H04N 7/15 | |
| | | | | 704/9 |

FOREIGN PATENT DOCUMENTS

| | | | | | |
|---|---|---|---|---|---|
| CA | 3148554 | A1 | * | 2/2021 | G06N 3/045 |
| CA | 3178823 | A1 | * | 5/2022 | G10L 21/00 |
| CA | 3016169 | C | * | 1/2024 | G06F 16/435 |
| CN | 103714813 | A | * | 4/2014 | G10L 15/22 |
| CN | 111062221 | A | * | 4/2020 | G10L 15/26 |
| CN | 112699677 | A | * | 4/2021 | G06F 40/284 |
| CN | 111460132 | B | * | 8/2021 | G06N 3/045 |
| CN | 113449513 | A | * | 9/2021 | G06N 7/01 |
| CN | 114402384 | A | * | 4/2022 | G10L 15/22 |
| CN | 113051932 | B | * | 11/2023 | G06F 40/30 |
| CN | 117015780 | A | * | 11/2023 | G06F 40/30 |
| CN | 117195887 | A | * | 12/2023 | |
| CN | 117236324 | A | * | 12/2023 | |
| JP | 3597697 | B2 | * | 12/2004 | G06F 16/345 |
| JP | 4345321 | B2 | * | 10/2009 | G06F 16/40 |
| WO | WO-2020214316 | A1 | * | 10/2020 | G06V 40/23 |

* cited by examiner

Figure 11:
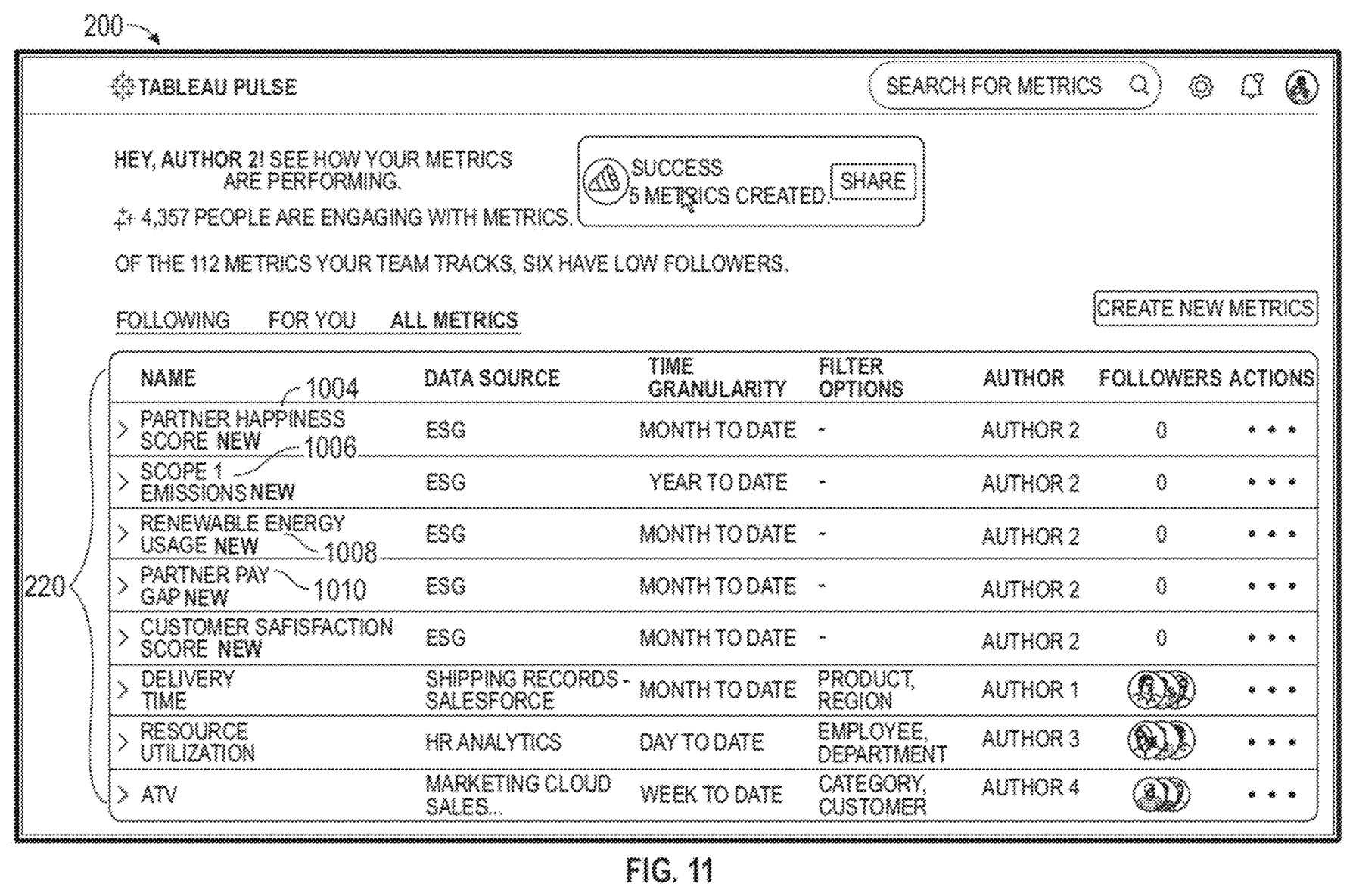

200

TABLEAU PULSE    SEARCH FOR METRICS 🔍 ⚙ 🗗 👤 🙈

HEY, AUTHOR 2! SEE HOW YOUR METRICS ARE PERFORMING.

✧ 4,357 PEOPLE ARE ENGAGING WITH METRICS

SUCCESS
5 METRICS CREATED.    SHARE

OF THE 112 METRICS YOUR TEAM TRACKS, SIX HAVE LOW FOLLOWERS.

FOLLOWING    FOR YOU    ALL METRICS

CREATE NEW METRICS

| NAME | DATA SOURCE | TIME GRANULARITY | FILTER OPTIONS | AUTHOR | FOLLOWERS | ACTIONS |
|------|-------------|------------------|----------------|--------|-----------|---------|
| ⌄ PARTNER HAPPINESS SCORE NEW ⌐1004 ⌐1006 | ESG | MONTH TO DATE | - | AUTHOR 2 | 0 | ⋮ |
| ⌄ SCOPE 1 EMISSIONS NEW | ESG | YEAR TO DATE | - | AUTHOR 2 | 0 | ⋮ |
| ⌄ RENEWABLE ENERGY USAGE NEW ⌐1008 | ESG | MONTH TO DATE | - | AUTHOR 2 | 0 | ⋮ |
| ⌄ PARTNER PAY GAP NEW ⌐1010 | ESG | MONTH TO DATE | - | AUTHOR 2 | 0 | ⋮ |
| ⌄ CUSTOMER SATISFACTION SCORE NEW | ESG | MONTH TO DATE | - | AUTHOR 2 | 0 | ⋮ |
| ⌄ DELIVERY TIME | SHIPPING RECORDS - SALESFORCE | MONTH TO DATE | PRODUCT, REGION | AUTHOR 1 | 👥👥 | ⋮ |
| ⌄ RESOURCE UTILIZATION | HR ANALYTICS | DAY TO DATE | EMPLOYEE, DEPARTMENT | AUTHOR 3 | 👥👥 | ⋮ |
| ⌄ ATV | MARKETING CLOUD SALES.. | WEEK TO DATE | CATEGORY, CUSTOMER | AUTHOR 4 | 👥👥 | ⋮ |

Figure 12:
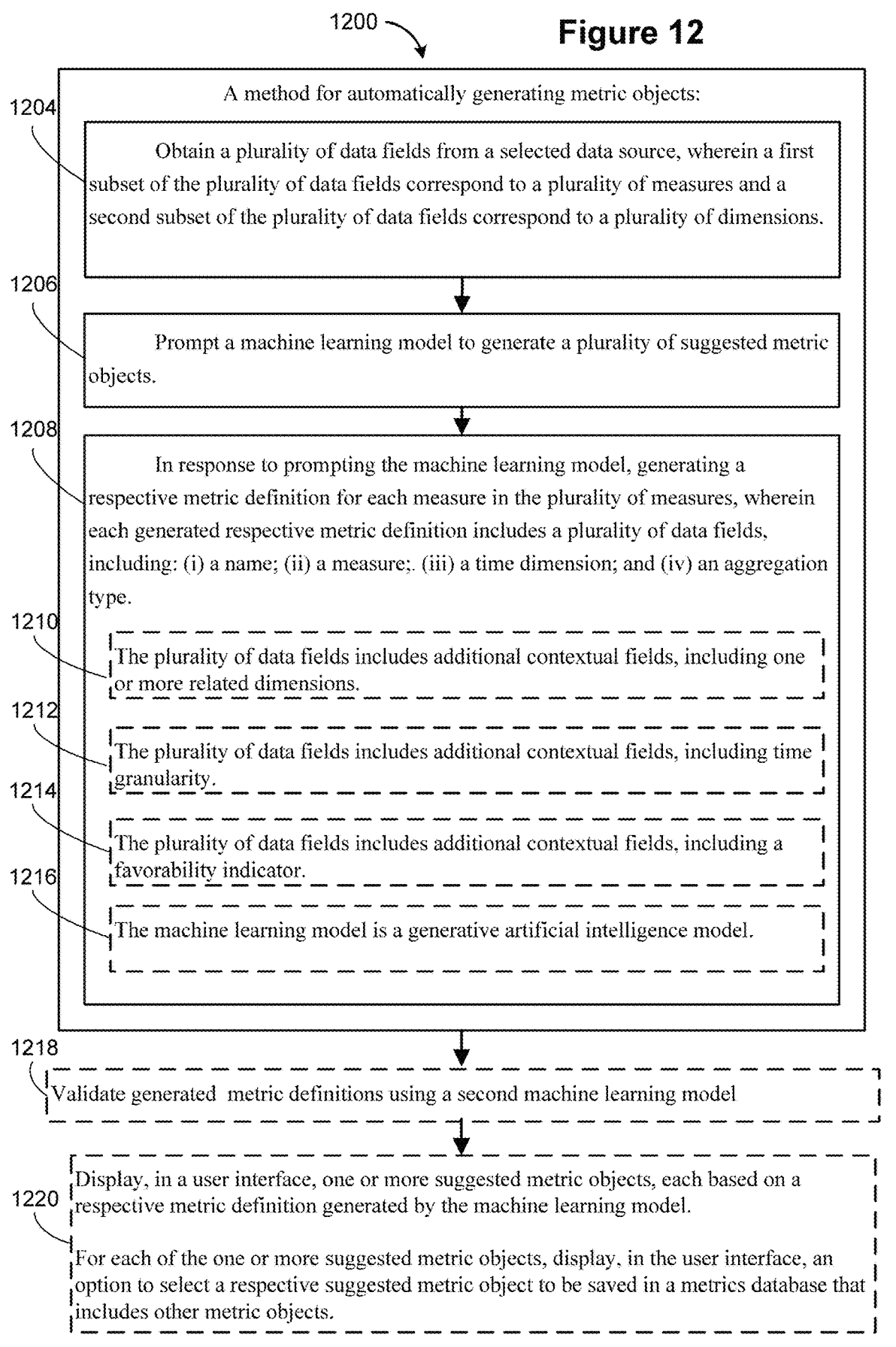

A method for automatically generating metric objects:

Obtain a plurality of data fields from a selected data source, wherein a first subset of the plurality of data fields correspond to a plurality of measures and a second subset of the plurality of data fields correspond to a plurality of dimensions.

1206

Prompt a machine learning model to generate a plurality of suggested metric objects.

1208

In response to prompting the machine learning model, generating a respective metric definition for each measure in the plurality of measures, wherein each generated respective metric definition includes a plurality of data fields, including: (i) a name; (ii) a measure;. (iii) a time dimension; and (iv) an aggregation type.

1210

The plurality of data fields includes additional contextual fields, including one or more related dimensions.

1212

The plurality of data fields includes additional contextual fields, including time granularity.

1214

The plurality of data fields includes additional contextual fields, including a favorability indicator.

1216

The machine learning model is a generative artificial intelligence model.

1218

Validate generated  metric definitions using a second machine learning model

1220

Display, in a user interface, one or more suggested metric objects, each based on a respective metric definition generated by the machine learning model.

For each of the one or more suggested metric objects, display, in the user interface, an option to select a respective suggested metric object to be saved in a metrics database that includes other metric objects.

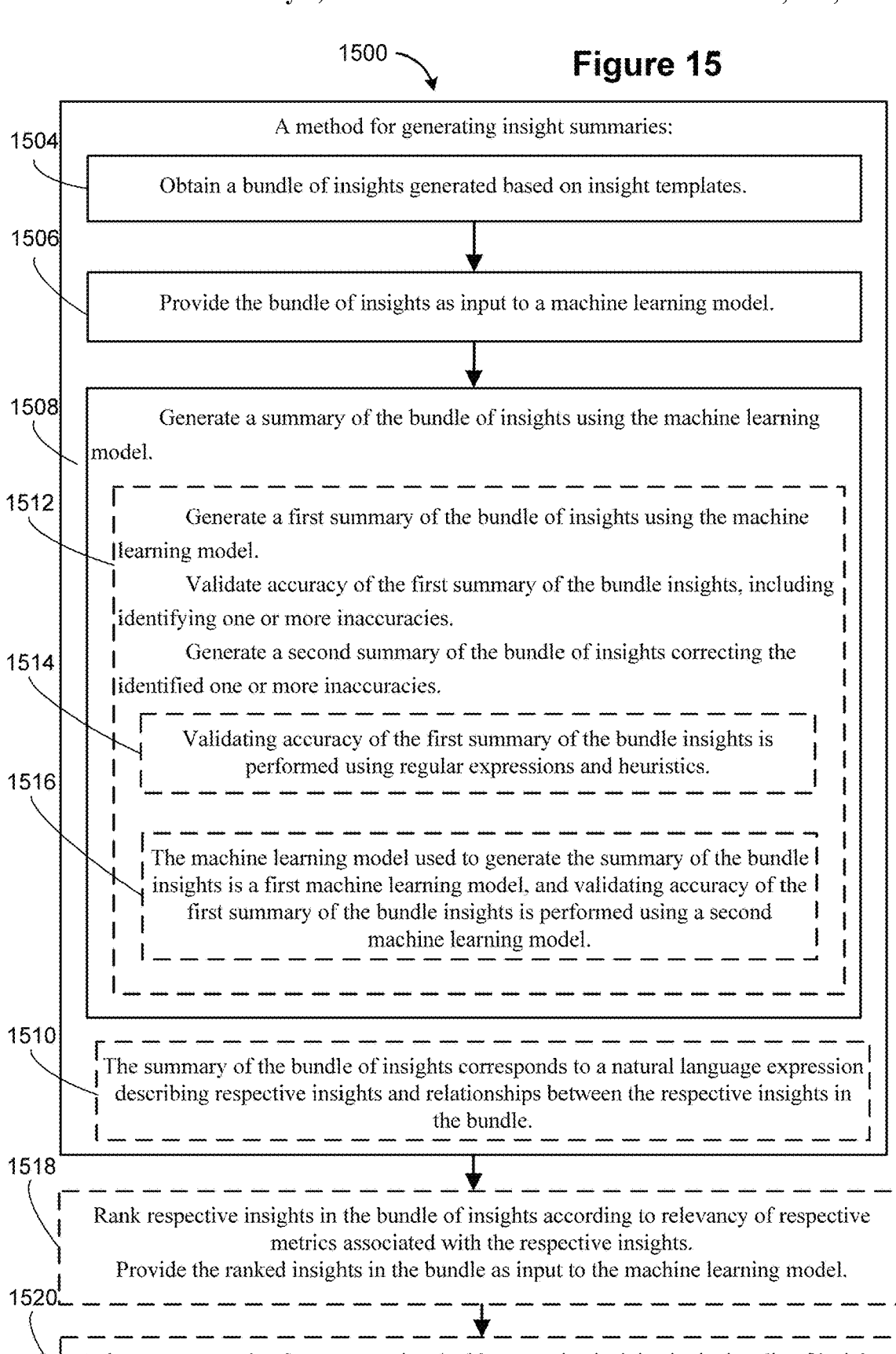

1504

A method for generating insight summaries:

Obtain a bundle of insights generated based on insight templates.

1506

Provide the bundle of insights as input to a machine learning model.

1508

Generate a summary of the bundle of insights using the machine learning model.

1512

Generate a first summary of the bundle of insights using the machine learning model.

Validate accuracy of the first summary of the bundle insights, including identifying one or more inaccuracies.

Generate a second summary of the bundle of insights correcting the identified one or more inaccuracies.

1514

Validating accuracy of the first summary of the bundle insights is performed using regular expressions and heuristics.

1516

The machine learning model used to generate the summary of the bundle insights is a first machine learning model, and validating accuracy of the first summary of the bundle insights is performed using a second machine learning model.

1510

The summary of the bundle of insights corresponds to a natural language expression describing respective insights and relationships between the respective insights in the bundle.

1518

Rank respective insights in the bundle of insights according to relevancy of respective metrics associated with the respective insights.
Provide the ranked insights in the bundle as input to the machine learning model.

1520

At least some metrics that are associated with respective insights in the bundle of insights have predetermined relationships to other metrics stored in a metrics database.

GENERATING AND VALIDATING DATA INSIGHTS USING MACHINE LEARNING MODELS

RELATED APPLICATIONS

This application claims priority to U.S. Provisional Patent Application No. 63/537,808, filed Sep. 11, 2023, titled "Metric Layer Bootstrapping," which is incorporated by reference herein in its entirety. The application relates to U.S. Utility patent application Ser. No. 18/429,072, entitled "Automatically Generating Metric Objects Using a Machine Learning Model," filed Jan. 31, 2024, which is incorporated by reference herein in its entirety.

TECHNICAL FIELD

The disclosed embodiments relate generally to data analytics and, more specifically, to systems and methods for automatically generating and validating data insights using machine learning models.

BACKGROUND

Data analysis is the process of inspecting, cleaning, transforming, and modeling data with the goal of discovering useful information, drawing conclusions, and supporting decision-making. It involves the use of various techniques, methods, and tools to examine and interpret data, uncover patterns, and extract insights. The primary objective of data analysis is to gain a better understanding of the underlying trends, relationships, and characteristics within the data. Data analysis is widely used across various industries and domains, including business, finance, healthcare, science, and technology. It plays a crucial role in extracting meaningful information from large and complex datasets, helping organizations make informed decisions and gain a competitive advantage.

SUMMARY

There is an increasing demand for making business insights accessible to business users and other users (e.g., in sales, marketing, HR, finance, or others) without the need for data analysts or scientists to manually create KPIs, metrics, data visualizations, or other business insights. The consumers of business insights have the need to make data-driven decisions but typically rely on others to manually create and track metrics for a selected data source. For example, a data analyst manually selects or creates various metadata that is used to provide business context for a metric. This process can be time consuming and inefficient.

Manual creation of metrics fails to leverage metrics already created by others and may result in duplicate efforts. Accordingly, there is a need to automate the process for creating metrics and to improve the metrics themselves by augmenting metrics with additional metadata that provide additional business context, thereby improving the business insights that can be generated using the metrics. The above deficiencies and other problems associated with generating metrics are reduced or eliminated by the disclosed systems and methods.

In accordance with some embodiments, a method is executed at a computer system having one or more processors and memory storing one or more programs configured for execution by the one or more processors. The method includes, obtaining a plurality of data fields from a selected data source, wherein a first subset of the plurality of data fields correspond to a plurality of measures and a second subset of the plurality of data fields correspond to a plurality of dimensions. The method further includes, prompting a machine learning model to generate a plurality of suggested metric objects. The method further includes, in response to prompting the machine learning model, generating a respective metric definition for each measure in the plurality of measures, wherein each generated respective metric definition includes a plurality of fields, including: (i) a name; (ii) a measure; (iii) a time dimension; and (iv) an aggregation type.

Today, the amount of data businesses have to analyze can be overwhelming, and reports are often presented in a one-size-fits-all way to serve many different teams at once. Users are left searching through the reports to find what's relevant to them, which can be time-consuming and inefficient. For example, a user may have to filter the same dashboard in multiple ways to find the numbers that are important. Accordingly, there is a need for natural language descriptions (e.g., digests or insights) of the data trends. Further, there is a need for improving discoverability of such digests or insights. Insights into data trends can be generated using templates. For example, templates can be used to generate accurate, simple, and short natural language expressions of insights or trends in the data, such as "CRM stock has been steadily climbing recently and hit $220, a 15% increase over 90 days ago ($190)." However, individual insights are not sufficient to give a business user a comprehensive understanding of various trends that are occurring in the data source. Accordingly, there is a need to generate summaries of multiple insights or trends. Using concatenation of individual templates while accurate can be repetitive, lengthy, and less legible. Accordingly, there is a need to generate summaries that are more legible. In some embodiments, large language models can be used to summarize multiple insights generated via templates. However, while the large language models produce legible and natural language, such models can hallucinate and insert inaccuracy in the data. Accordingly, there is a need to generate summaries that are legible and accurate. The above deficiencies and other problems associated with generating insights are reduced or eliminated by the disclosed methods and systems.

In accordance with some embodiments, a method is executed at a computer system having one or more processors and memory storing one or more programs configured for execution by the one or more processors. The method includes, obtaining a bundles of insights generated based on insight templates. The method further includes, providing the bundle of insights as input to a machine learning model. The method further includes, generating a summary of the bundle of insights using the machine learning model.

In accordance with some embodiments, the computer system includes one or more input devices, one or more processors, and memory storing one or more programs. The one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by one or more processors cause a computer system to perform or cause performance of the operations of any of the methods described herein.

The disclosed methods, systems, and databases provide automatic generation of metric objects.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Embodiments below, in conjunction with the following drawings in which like reference numerals refer to corresponding parts throughout the figures.

FIG. 11 illustrates a user interface for viewing and creating metrics using machine learning models, in accordance with some embodiments.

FIG. 12 is a flowchart diagram of a process for automatically generating metric objects, in accordance with some embodiments.

FIG. 15 is a flowchart diagram of a process for generating and validating data insights using machine learning models, in accordance with some embodiments.

Figure 1:
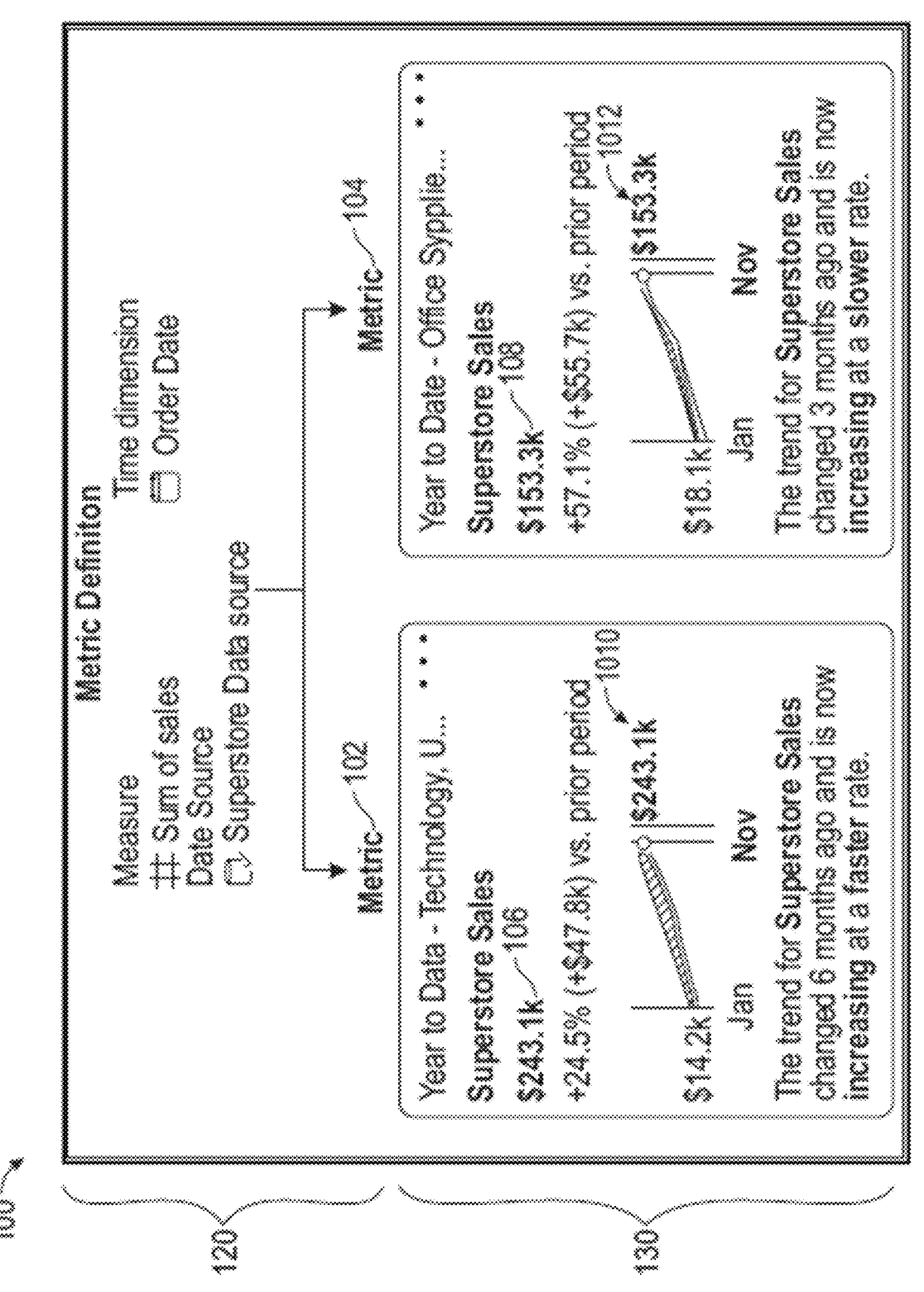
FIG. 1 illustrates a schematic system diagram for automatically generating metrics using a machine learning model, in accordance with some embodiments.

Reference will now be made to embodiments, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF EMBODIMENTS

Metric definitions for metrics have typically been created manually by data analysts or other users with specialized knowledge in data analysis, data science, or other expert skills. In some embodiments, the described methods and systems provide a technique for automatically generating and recommending metric objects (e.g., respective metric definitions or metric data structures) using a machine learning model (e.g., a large language model).

In some embodiments, a data analytics tool such as Tableau Pulse provides insights about data based on predefined metrics. After a metric is created, members of an organization can be added as followers of the metric. In some embodiments, such members can receive a regular email or a digest about metrics to which they are subscribed. Such emails or digests surface trends, outliers, and other changes, keeping followers up to date on relevant data. To learn more about the data, users can investigate a metric (e.g., on a system such as Tableau Cloud) and see how different factors contribute to changes in the data. Such insights into relevant data allow uses to make data-driven decisions without requiring complex analysis and configuration.

Metrics are analytical objects that can be interacted with and viewed in a user interface. Metric definitions have an underlying data structure that represents a respective metric. In some embodiments, Table 1 below illustrates an example of a metric definition.

TABLE 1

| Metric Definition for Super Store | |
| --- | --- |
| Definition field | Example value |
| Metric name | Superstore Sales |
| Measure | Sales |
| Aggregation | Sum (e.g., SUM of Sales) |
| Time dimension | Order Date |
| Adjustable metric filters | Region, Category |
| Number format | Currency |
| Favorability indicator (e.g., Value is going up) | Favorable |

In some embodiments, metrics (also referred to as metric objects) are created when additional data fields (e.g., business context data fields) associated with a metric are adjusted or configured. This occurs, for example, when respective time context options (e.g., time granularity) or filters are specified. In some embodiments, Tables 2 and 3 provide an example of the options configured for related metrics. These options are applied on top of the core value that is specified by a respective metric definition.

TABLE 2

| Related metric for Superstore Sales - Technology | |
| --- | --- |
| Metric option | Example value |
| Time granularity | Quarter to date |
| Time comparison | Compared to previous year |
| Filters | Category: Technology |

TABLE 3

| Related metric for Superstore Sales - Office Supplies | |
| --- | --- |
| Metric option | Example value |
| Time granularity | Year to date |
| Time comparison | Compared to previous year |
| Filters | Category: Office Supplies |

A metric definition captures the core value that is being tracked. At a basic level, this value is an aggregate measure tracked based on a time dimension. The definition also specifies options such as the dimensions that viewers are able to filter by, the way the value is formatted, and the types of insights displayed. When a metric definition is created, the system (e.g., Tableau Pulse) automatically creates an initial related metric. The initial metric created for a definition has no filters applied. When users of an organization adjust the metric filters or time context in a new way, the system creates an additional related metric. For example, a member of a sales organization and/or other users of that organization may need to track metrics across different territories and product lines. In Tableau Pulse, a metric definition can be created that includes the core value of the sum of daily sales with adjustable metric filters for region and product line. Then, a user can create related metrics for each region and product line. Additionally, members of the organization can be added as followers to the related metrics to view where and what is being sold.

In some embodiments, members in an organization follow metrics, not metric definitions. By following individual metrics, users can get insights specific to the dimensions that are relevant for them. The metric definition allows for managing data for related metrics from a single parent definition. If a field in a data source changes, the metric definition can be updated to reflect this change, and all metrics related to that definition will automatically reflect the change (e.g., without the need to update each related metric individually).

In some embodiments, a relationship 100 between a metric definition for a metric object labeled "Superstore Sales" described in Table 1 and the two metrics 102 and 104 that are based on the metric definition "Superstore Sales" described in Tables 2 and 3, respectively, are illustrated in FIG. 1. Portion 120 illustrates values of the data fields (i) measure, (ii) aggregation, and (iii) time dimension for the metric object labeled "Superstore Sales." Portion 130 illustrates metrics 102 and 104. Metrics 102 and 104 include additional business context generated based on additional contextual fields that are specified. For example, metric 102 includes the sum of all sales from Quarter to date for a category "Technology," where the value 106 of the aggregated measure is displayed in the metric 102 (e.g., $243.1 k). Metric 104 includes the sum of all sales Year to Date for category "Office Supplies," where the value 108 of the aggregated measure is displayed in the metric 104 (e.g., $153.3 k). Metrics 102 and 104 are interactive objects that further include textual descriptions of how the metric is performing over time (e.g., compared to previous year, previous quarter, previous month, week, or day) or other types of performance indicators. Further, metrics 102 and 104 may include a miniature data visualization (e.g., a chart) that illustrates the aggregated measure across the selected time dimension, and optionally at the specified time granularity for selected dimensions. For example, metric 102 includes a line chart 1010 (e.g., a sparkline) that illustrates how the sum of sales for category "Technology" changed over a period of time from January to November, and metric 104 includes a line chart 1012 (e.g., a sparkline) that illustrates how the sum of sales for category "Office Supplies" changed over a period of time from January to November.

In some embodiments, metrics, such as the metrics 102 and 104, for which additional contextual data is specified (e.g., filters, time granularity, time comparisons, and other data fields) are referred to as scoped metrics.

Figure 3:
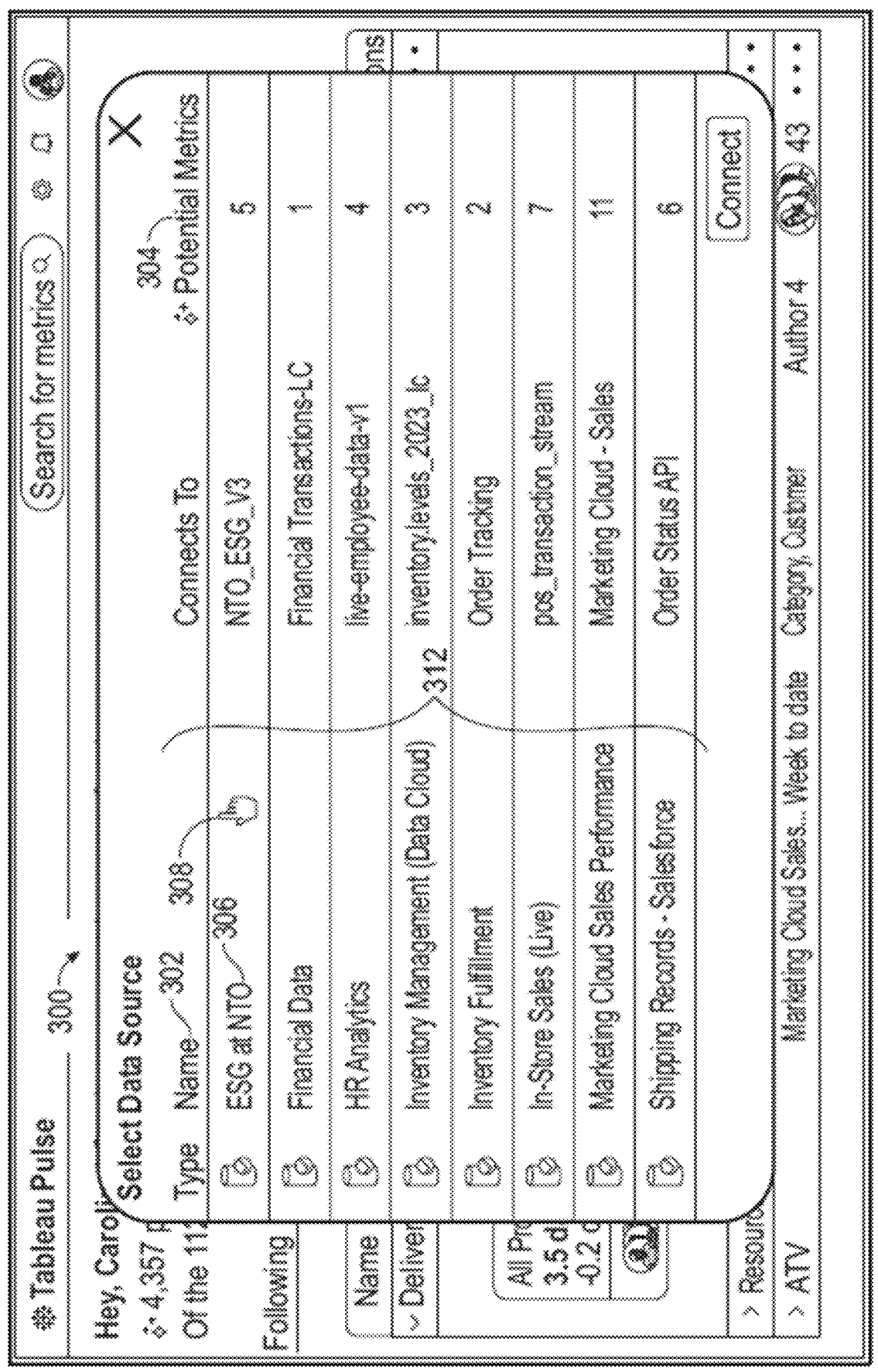
Figure 4:
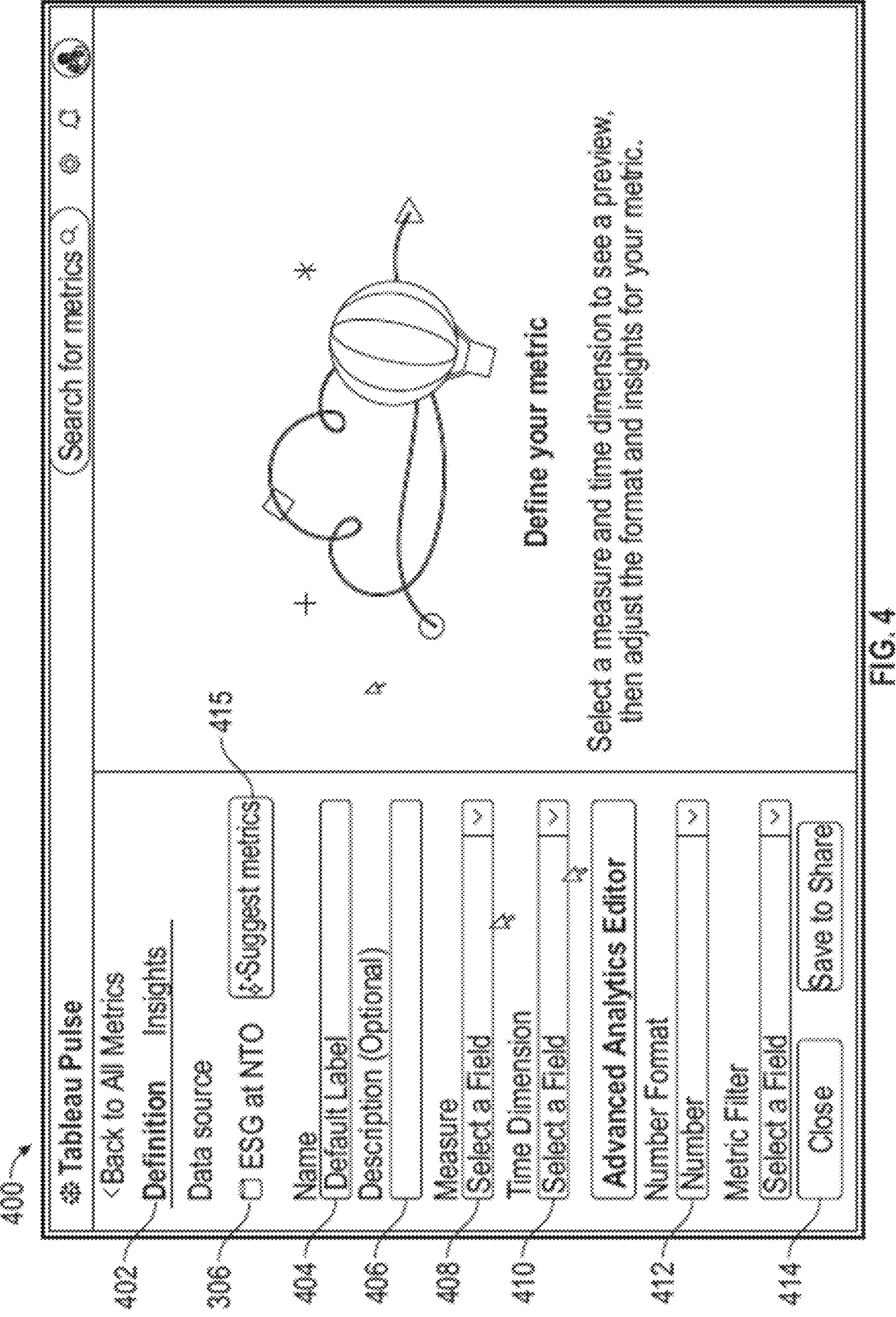
Figure 5:
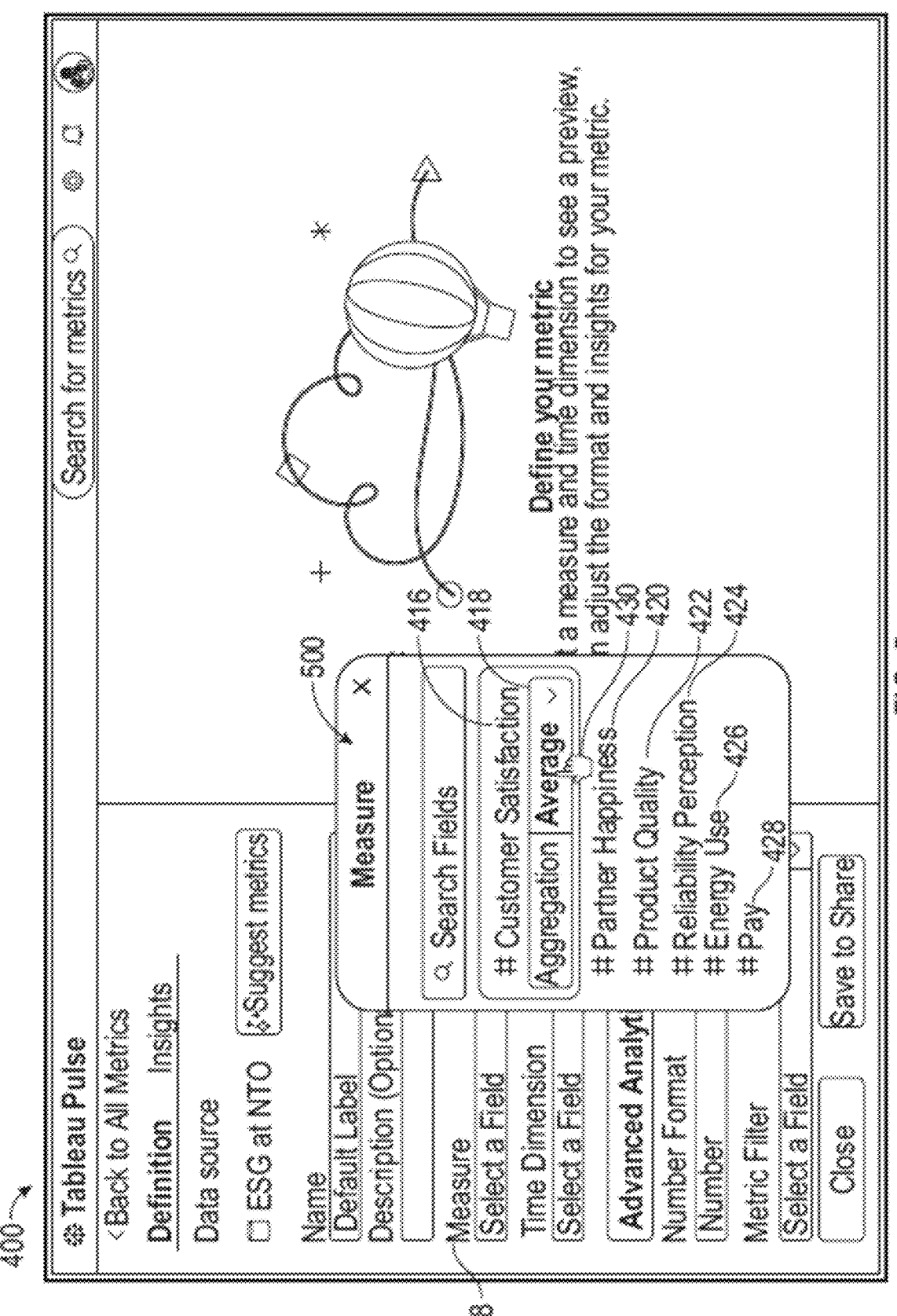
Figure 6:
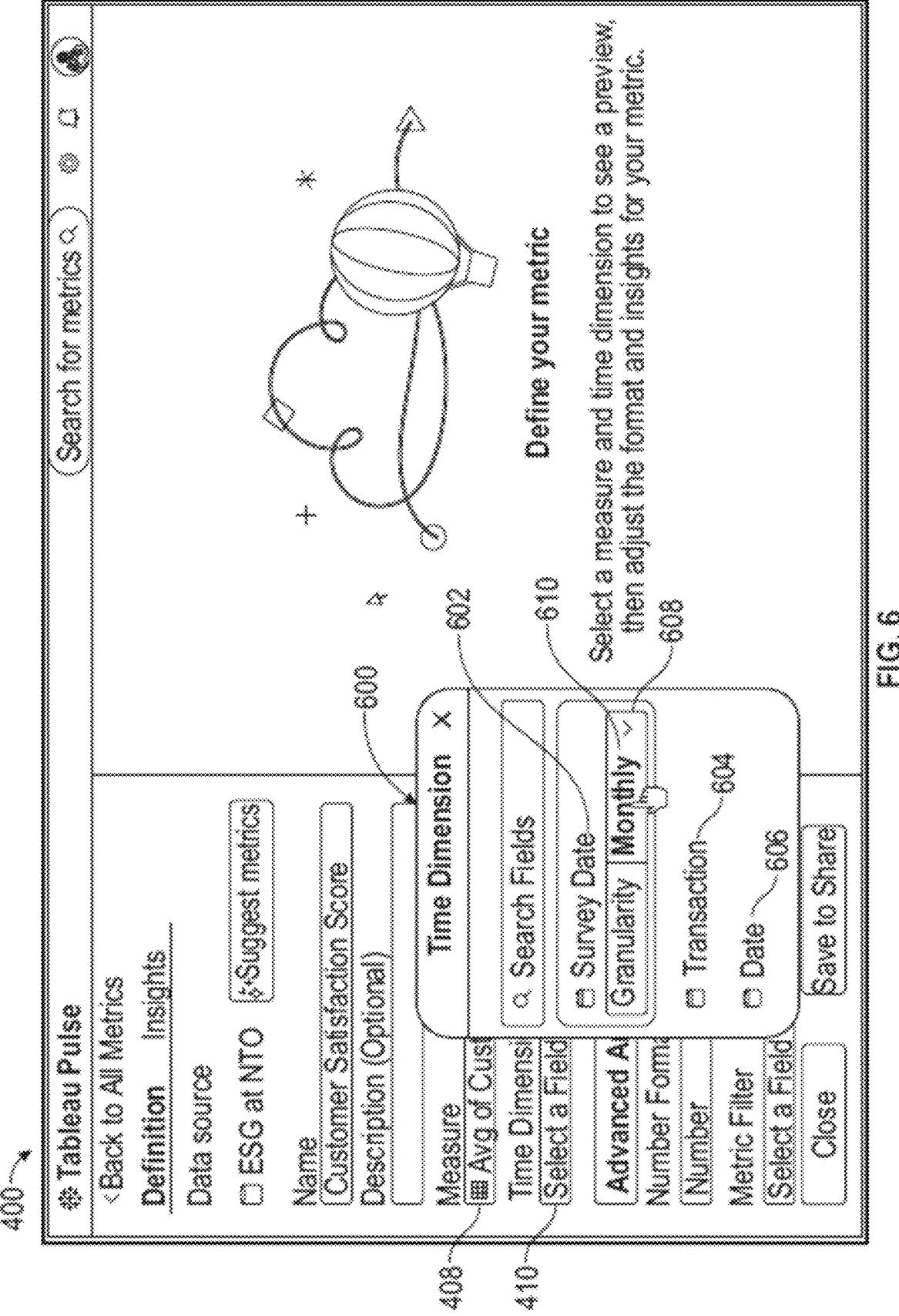
Figure 7:
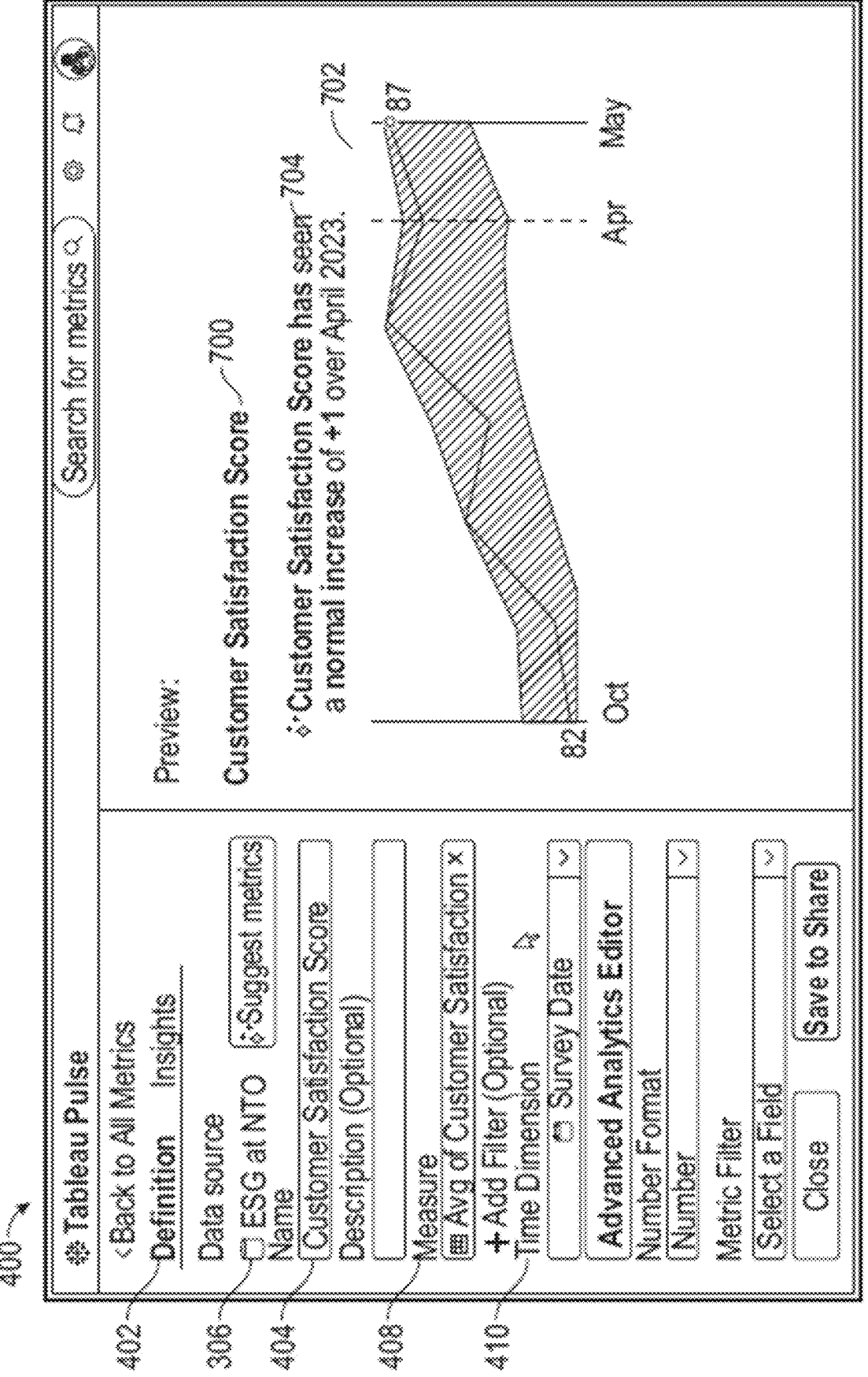

FIGS. 2-7 illustrate user interfaces for viewing and creating metrics, according to some embodiments. A manual process for creating metric definitions and/or respective metrics based on the metric definitions is illustrated in FIGS. 5-7.

Figure 2:
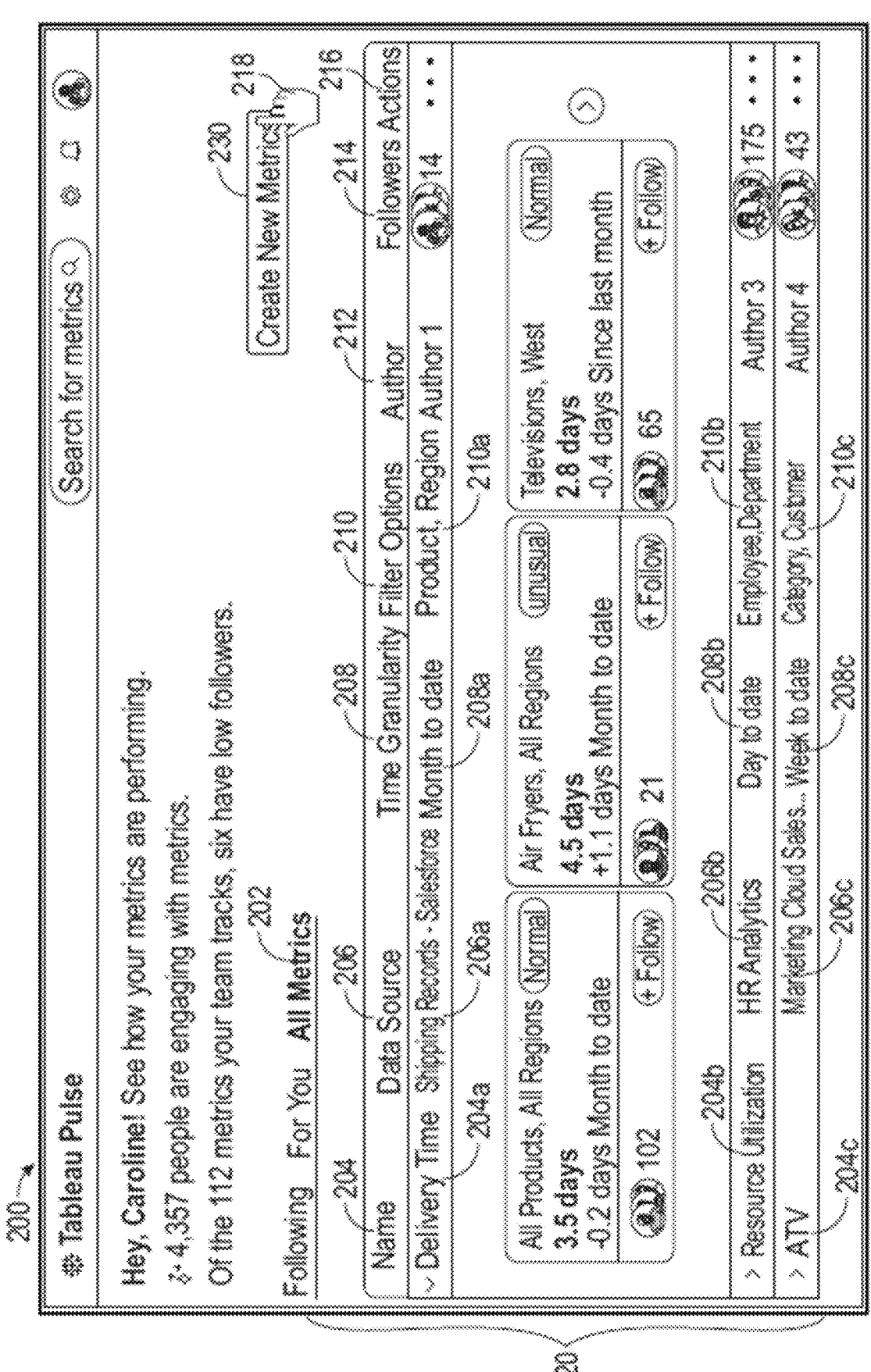
FIGS. 2-7 illustrate user interfaces for viewing and creating metrics, according to some embodiments.

FIG. 2 illustrates a user interface 200 for viewing and creating metrics, according to some embodiments. User interface 200 includes control 202 "All Metrics" that when selected, causes a computer system to display a list 220 of metrics (e.g., metrics to which a respective user has access to) that are stored and available for viewing. For each metric displayed in the list of metrics 220, attributes (also referred to as data fields, for example, in the context of metric definitions) associated with each metric are displayed in the list of metrics 220. The attributes include a name 204 that corresponds to a label or name of each metric. For example, in the user interface 200, the metrics with names "Delivery Time" 204*a*; "Resource Utilization" 204*b*, and "ATV" 204*c* are visible. The attributes further include a data source 206 from which the respective metrics are created. For example, the metric labeled "Delivery Time" 204*a* is created for the data source "Shipping Records-Salesforce" 206*a*; the metric labeled "Resource Utilization" 204*b* is generated for the data source "HR Analytics" 206*b*; and the metric labeled "ATV" 204*c* is generated for the data source "Marketing Cloud Sales" 206*c*. The attributes further include a time granularity 208 that corresponds to contextual time frames over which a respective measure associated with the respective metric is aggregated. For example, the metric labeled "Delivery Time" 204*a* is aggregated for the period "Month to Date" 208*a*; the metric labeled "Resource Utilization" 204*b* is aggregated for the period "Day to Date" 208*b*; and the metric labeled "ATV" 204*c* is aggregated for the period "Week to date" 208*c*. The attributes further include filter options 210 that specify filters that are used to select the records that are used in aggregating the respective measure associated with the respective metric. For example, the metric labeled "Delivery Time" 204*a* is aggregated across "Product" and "Region" dimensions 210*a*; the metric labeled "Resource Utilization" 204*b* is aggregated across "Employee" and "Department" dimensions 210*b*; and the metric labeled "ATV" 204*c* is aggregated across "Category" and "Customer" dimensions 210*c*. The attributes further include an author 212 of respective metrics (e.g., the user that generated the respective metric manually or automatically). The attributes further include a followers list 214 for respective metrics (e.g., users in an organizations that have subscribed to or follow performance of the metric). The attributes further include an actions list 216, which specifies the actions that can be performed with the respective metric.

Further, a user input 218 is detected selecting the "Create New" control 230 for creating new metrics. In response to selecting the control 230, a user interface 300 for selecting a data source is displayed, as illustrated in FIG. 3. Data sources 312 that are available for selection are listed in user interface 300. For each data source in the list of data sources 312, a name 302 and the number of potential metrics 304 are displayed in user interface 300. For example, for the data source 306 named "ESG at NTO," the system determines that there potentially 5 metrics can be generated. In some embodiments, a metrics service (e.g., the metrics service 812, described in relation to FIG. 8) determines the number of potential metrics 304 for each data sources based on a number of data fields in the respective data source that corresponds to a measure.

FIG. 3 further illustrates input 308 that selects the data source 306 named "ESG at NTO." In response, the user interface 400 for creating a metric definition 402 is displayed in FIG. 4. In FIG. 4, the data source 306 named "ESG at NTO" is already pre-populated in the metric definition 402 in response to the user input 308. As illustrated in FIG. 4, the metric definition 306 includes a number of data fields 404-414. Some data fields, such as name 404, measure 408, and time dimension 410 correspond to core data fields, and other data fields such as the description 406, number format 412, and metric filter 414 are optional or additional contextual data fields.

In some embodiments, a name 404 is a label for the metric that is generated based on the created metric definition, such as "Delivery Time," "Resource Utilization," "Average of Partner Happiness," "Sum of Emissions," "Sum of Energy Use," "Partner PayGap," "Appliance Sales," "Branch Revenue," "Campaign ROI," and/or other textual description of a respective metric). In some embodiments, a measure 408 corresponds to a data field in the data source, such as a column in a relational database table (e.g., Revenue, Expenses, or other measures depending on the data source). For example, measures that can be selected are fetched from the selected data source 306. In some embodiments, fetched measures and associated aggregation types can be selected together. Examples of aggregation types include, but are not limited to, SUM, AVG, MAX, MIN, Median, Percentile, Standard Deviation, and COUNT. In some embodiments, a time dimension 410 corresponds to a data field in the data source that includes date and/or time (e.g., order date) by which the measure is aggregated.

FIGS. 5-7 illustrates a user manually selecting respective values for the core data fields 404, 408, and 410 of the metric definition 402. Alternatively, a user can select a "Suggest Metrics" control 416 for automatically generating suggested metrics, and a metric service prompts a machine learning model to generate suggested or recommended metrics for the selected data source 306. This process for automatically suggesting metrics using a machine leaning model is described in further detail in relation to FIGS. 8-9.

FIG. 5 illustrates a menu 500 for selecting or searching for measures in the selected data source 306. In some embodiments, the menu 500 is displayed in response to a user input selecting a data field 408. In the menu 500, a number of measures are displayed, including a first measure 416 "Customer Satisfaction," a second measure 420 "Partner Happiness," a third measure 422 "Product Quality," a fourth measure 424 "Reliability Perception," a fifth measure 426 "Energy Use," and a sixth measure 428 "Pay." In FIG. 5, the user has selected the first measure 416 "Customer Satisfaction," and the aggregate type 418 is pre-populated by default. In FIG. 5, the pre-populated aggregation type 418 is "Average." Further, FIG. 5 illustrates user input 430 selecting the aggregate type 418 "Average."

FIG. 6 illustrates a transition from FIG. 5 in response to the user input 430 selecting the aggregate type 418 "Average," and further input selecting the data field 410 that corresponds to a time dimension. In response to user input selecting the data field 410, the menu 600 for selecting or searching for dimensions in the selected data source 306 is displayed. In the menu 600, a number of dimensions are displayed, including a first dimension 602 "Survey Data," a second dimension 604 "Transaction," and a third dimension "Date" 606. In FIG. 6, the user has selected the first dimension 602 "Survey Data," and the time granularity 608 is pre-populated by default. In FIG. 6, the pre-populated time granularity 608 is "Monthly." Further, FIG. 6 illustrates user input 610 selecting the time granularity 608 "Monthly."

FIG. 7 illustrates a metric "Customer Satisfaction Score" 700 generated based on the metric definition 402 created manually by the user, as illustrated in FIGS. 4-6. The metric "Customer Satisfaction Score" 700 illustrates average customer satisfaction based on survey data in a line chart 702. Further, a textual description 704 of the performance or trend of the average customer satisfaction is also included in the metric "Customer Satisfaction Score" 700.

Figure 8:
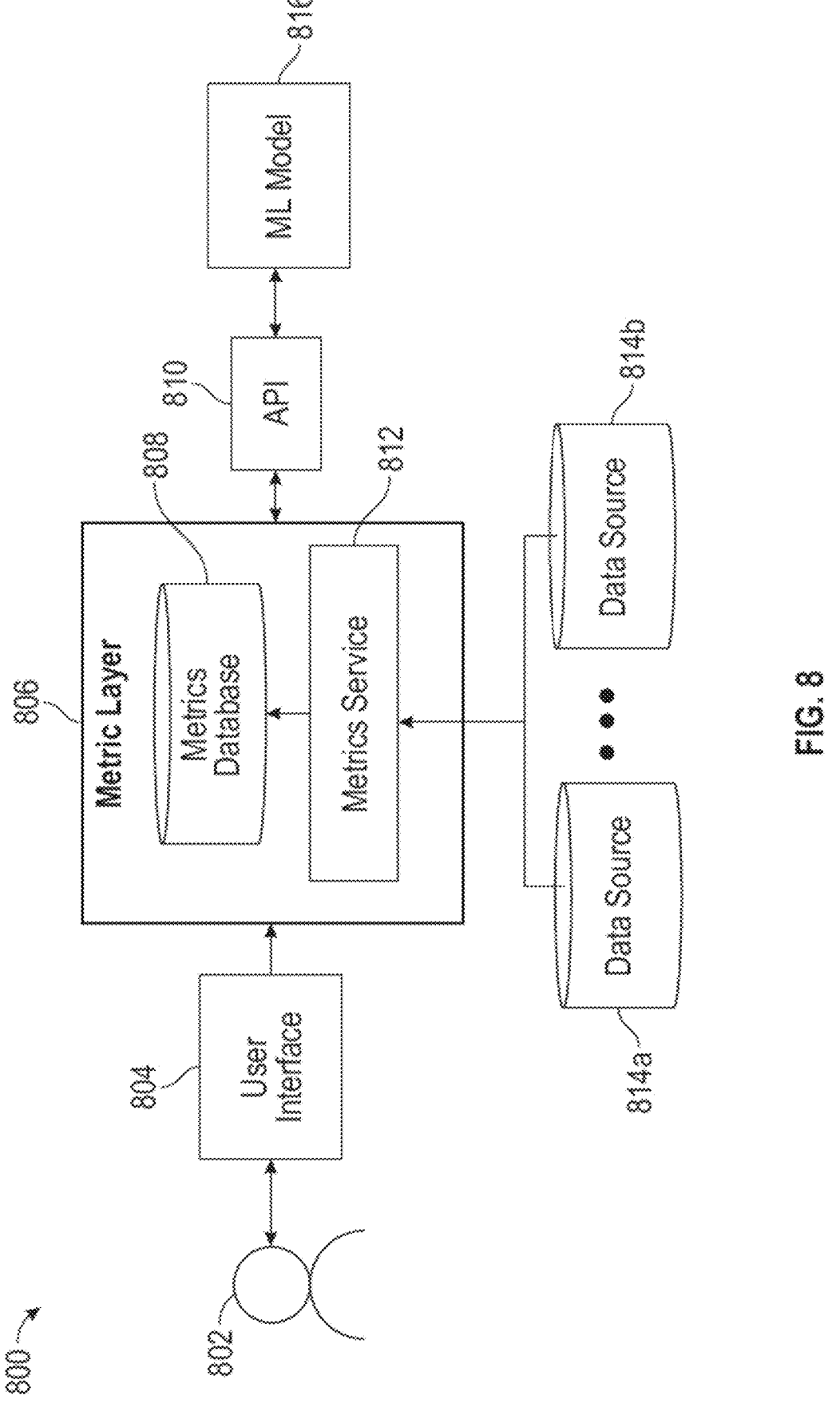
FIG. 8 illustrates a schematic system for generating metric objects using a machine learning model, in accordance with some embodiments.
Figure 9:
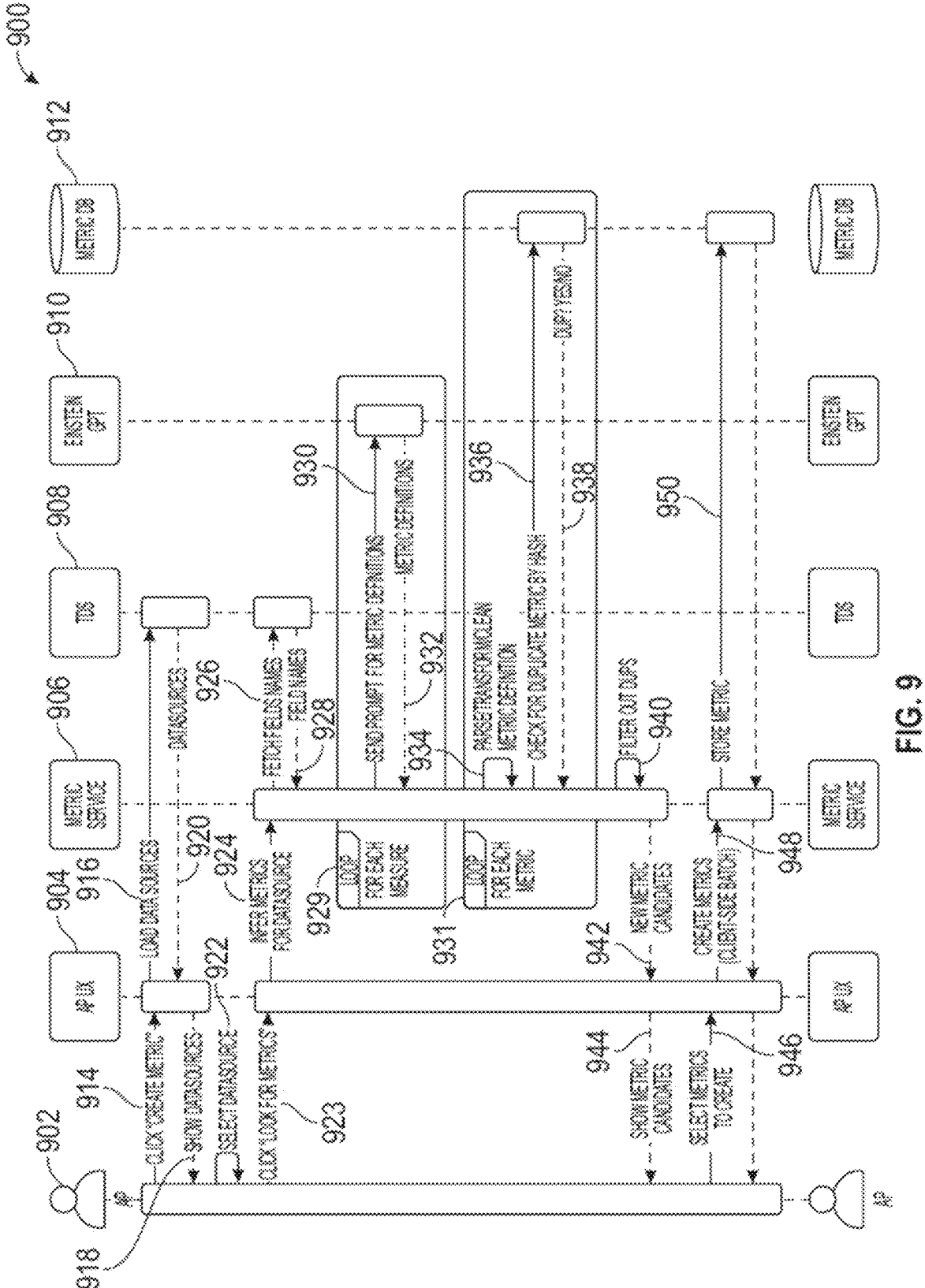
FIG. 9 illustrates a process for automatically generating metrics using a ML model, in accordance with some embodiments.

In some embodiments, FIG. 8 illustrates a system 800 for generating metric objects using a machine learning model, and FIG. 9 illustrates a process 900 for generating metric objects using a machine learning model.

FIG. 8 is a schematic system 800 for generating metric objects using a machine learning model. In some embodiments, a user 802, via a user interface 804, can initiate a process for creating one or more metrics. For example, the user 802 may select a control in user interface 804, and in response, the metric service 812 in the metrics layer 806 retrieves data from one or more data sources, such as data source 814a and data source 814b. In some embodiments, the metrics layer 806 accesses or retrieves data from a variety of data sources including, but not limited to, Comma-Separated Values (CSV) files, Excel Spreadsheets, relational databases (e.g., MySQL, PostgreSQL, Microsoft SQL Server, or Oracle Databases), cloud-based data sources (e.g., Google BigQuery, Amazon Redshift), NoSQL Databases (e.g., MongoDB), Web Data Connectors, and other multidimensional, relational, and/or hierarchical data sources. A user can select data retrieved from the data source 814a and the data source 814b.

In some embodiments, a user 802 can manually create a metric definition (e.g., the metric definition 402 in FIG. 7) for a metric (also referred to as a metric object) (e.g., the "Customer Satisfaction Score" 700) by providing values for data fields (e.g., one or more of data fields 404-414) that are included in a metric definition. The manual process for creating a metric object is further described in relation to FIGS. 5-7. In some embodiments, the user 802, via the user interface 804, can request that metrics are generated automatically. In some embodiments, the process for automatically generating suggested metrics is further described in relation to FIG. 9. In some embodiments, the suggested metrics can be generated without the user 802 specifying any data field (or attribute or metadata) of the metric definition. In some embodiments, the user 802 can specify some data fields of the metric definition, and the remaining data fields can be automatically generated (e.g., by the metrics service 812).

In response to the user 802's request, the metrics service 812 retrieves respective data fields from the selected data source. In some embodiments, the metric service 812 requests fetching of data fields (e.g., all data fields) from the selected data source, and determines a subset of data fields from the fetched data fields that correspond to measures. A metrics service 812 sends a prompt (e.g., a request), via application programming interface (API) 810, to a machine learning (ML) model 816 to generate a respective metric definition for each of the subset of measures in the fetched data fields. In some embodiments, the metrics service 812 (e.g., conceptually part of a metrics layer) is called or used by various analytical tools and applications (e.g., by Tableau Pulse). In some embodiments, metrics service 812 makes one prompt request per metric.

In some embodiments, the ML model 816 is a large language model, such as a generative pre-trained transformer. In some embodiments, the ML model 816 is pre-trained on a data source that already includes metadata and/or semantics that have been pre-configured or predetermined by a user (e.g., a data analyst or other user that has domain knowledge). In some embodiments, examples of such semantics and/or metadata data include, but are not limited to, columns that are labeled as measures; names or labels for the measures; usage of the measures across different workbooks, including labels or descriptions of those workbooks (e.g., the measure Sales has been used in a workbook described or labeled as Sales over time), pre-existing aggregations of the measures, calculations in which the measures were used, and/or breaking down of the measures by different dimensions; formatting, styling, and/or visual encodings associated with the measures; and data visualizations in which the measures have been used. In some embodiments, such semantics and/or metadata in the data source provide domain specific knowledge on which the ML model 816 is trained. In some embodiments, in addition to training the ML model 816, such semantics and/or metadata are provided to the ML model 816 from the selected data source in the prompt request (e.g., provided as input to the machine learning model). In some embodiments, the ML model 816 is further trained on textual corpuses produced by humans, such as publications and resources on the Internet. In some embodiments, training the ML model 816 on such textual corpuses is advantageous because the ML model 816 can determine additional semantic and business context that is not typically available in the selected source. For example, the ML model 816 can determine whether a particular change of an aggregated measure over time is positive, neutral, or negative, thereby generating values for a data field of a metric definition that corresponds to a favorability indicator.

In some embodiments, the ML model 816 outputs a number of metric definitions for suggested metric, and the generated metrics definitions are returned to the metrics service 812 via the API 810. The metrics service 812, after transforming and/or de-duplicating the generated metrics definitions, sends a final list of suggested metrics to user interface 804. In some embodiments, the user 802 may modify the suggested metrics, save, and/or discard some of them. In some embodiments, the generated metrics (and respective metric definitions) are stored in a metrics database 808 and used by the metrics service 812. In some embodiments, metric definitions generated by ML model 816 are cached per data source to reduce the computational cost (e.g., the number of requests) of using the ML model 816.

In some embodiments, metrics service 812 prompts the ML model 816 in response to user requests. In some embodiments, the metrics service 812 scans the available data sources for changes (e.g., adding measures), and can automatically suggests metrics to the user 802 without additional user input requesting the suggested metrics. In some embodiments, the user 802 can export charts as metrics, thereby creating metric definitions without entering values for the data fields and without prompting the ML model 816. For example, a user may be viewing a line chart with measures and dimensions in a workbook, and the metrics service 812 may prompt the user to generate a metric from the line chart and the respective measure and dimension. In some embodiments, the ML model 816 infers or generates remaining data fields of the metric definition that remain uncompleted by exporting the line chart as a metric.

Figure 10:
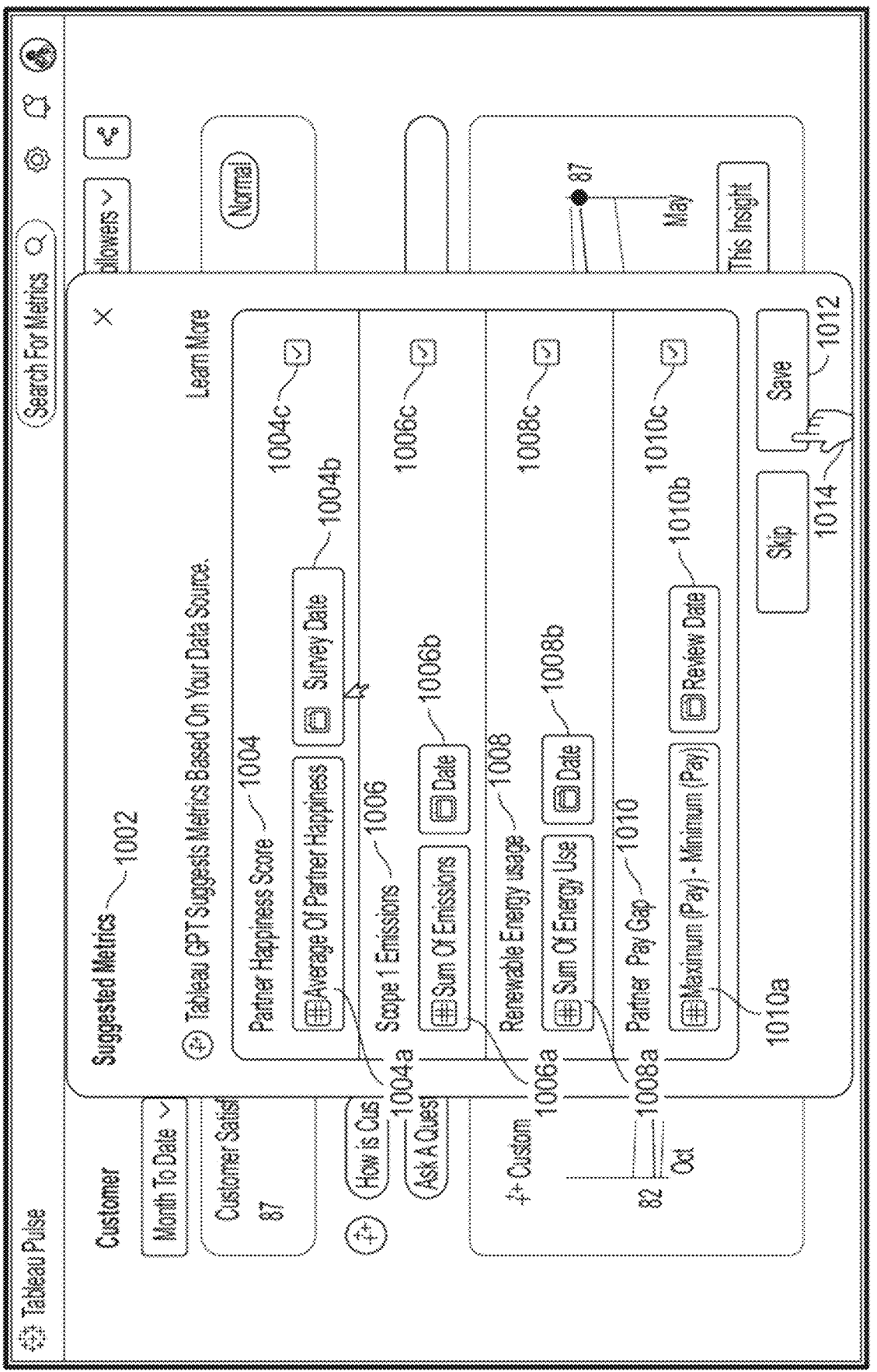
FIG. 10 illustrates suggested metrics generated using a machine learning model, in accordance with some embodiments.

FIG. 9 illustrates a process 900 for automatically generating metrics using a ML model. Process 900 is initiated by user 902 at step 914 by selecting or clicking on a control for creating metrics (e.g., user input 218 selecting control 230 for creating new metrics, as in FIG. 2). In response, at step 916, user interface 904 sends a request to retrieve or load available data sources 908. At step 920, available data sources (e.g., data sources 312 in FIG. 3) are loaded in user interface 904, and, at step 918, the loaded data sources are displayed to user 902 (e.g., in user interface 300 for selecting a data sources, FIG. 3). At step 922, user 902 selects respective data sources from the displayed data sources (e.g., user input 308 in FIG. 3). Further, at step 923, user 902 selects a control that requests that suggested metrics be generated (e.g., control 416 in FIG. 4). In response, at step 924, a request is sent from the user interface 904 to metric service 906 to infer or determine metrics from the selected data source (e.g., data sources 306 selected from data sources 312 in FIG. 3). In response to the request, at step 926, metric service 906 sends a request to the selected data source in data sources 908 to fetch the data fields in the data sources. At step 928, the selected data source in data sources 908 fetches or sends the data fields (e.g., data fields names) in the selected data source. At step 929, metric service 906 selects each measure in the fetched data fields (e.g., loops over a subset of data fields that correspond to measures in the fetched data fields) and, at step 930, sends a prompt for each measure (e.g., a separate prompt is optionally sent for each measure) in the fetched data fields to machine learning model 910 (e.g., large language processing model). At step 932, machine learning model 910 responds and sends to metric service 906 generated metric definitions for each measure in the fetched data fields. At step 931, metric service 906 selects each metric definition (e.g., optionally one by one in a loop cycle) and performs post-processing operations. For example, at step 934, metric service 906 parses and transforms each metric definition. Additionally, at step 936, metric service 906 checks whether a respective metric definition in the generated metric definitions is a duplicate of another metric definition that is already stored in metrics database 912 (e.g., the check for duplicates can be performed using a has function). At step 938, the metrics database 912 returns to metric service 906, a determination whether a duplicate exist for each respective metric definition. At step 940, metric service 906 removes any duplicates from the list of generated metric definitions. At step 942, metric service 906 returns a list of suggested metrics (e.g., a list of the generated metric definitions that are transformed and without duplicates) to user interface 904. At step 942, the list of suggested metrics is displayed in user interface 904 (e.g., available for viewing by user 902). For example, a list of suggested metrics 1002 is illustrated in FIG. 10. In some embodiments, at step 946, user 902 selects some or all of the suggested metric for saving in the metrics database 912 (e.g., by checking or unchecking a selection box, such as selection boxes. In some embodiments, at step 948, the metric service 906 receives a request from user interface 902 to generate and store metric definitions in the metrics database 912 for all metrics selected in step 946, and, in response, metric service 906 stores all metrics selected in step 946 in the metrics database 912.

In some embodiments, metrics that are based on metric definitions generated by a machine learning model can be tagged to indicate to a user that a further review or validation is necessary. In some embodiments, user 902 can edit, validate, or otherwise interact with the metrics based on metric definitions generated by the machine learning model.

FIG. 10 illustrates suggested metrics 1002 generated using a machine learning model in accordance with process 900. For example, for the selected data source 306 data source 306 named "ESG at NTO," the machine learning model generated and provided as output suggested metrics 1002 based on available measure in the selected data source 306. The list of suggested metrics 1002 includes metric 1004 "Partner Happiness Score", metric 1006 "Scope 1 Emissions", metric 1008 "Renewable Energy Usage", metric 1010 "Partner Pay Gap." Each metric can be selected or unselected for storage in the metrics database 912 using respective controls 1004*c*, 1006*c*, 1008*c*, 1010*c*. In addition to the metric name/label, values for the aggregated measure and time dimension are displayed for each respective metric are in the list of suggested metrics 1002. For example, for metric 1004 "Partner Happiness Score", the aggregate measure 1004*a* is "Average of Partner Happiness" and the time dimension 1004*b* is "Survey Data"; for metric 1006 "Scope 1 Emissions", the aggregate measure 1006*a* is "Sum of Emissions" and the time dimension 1006*b* is "Date"; for metric 1008 "Renewable Energy Usage", the aggregate measure 1008*a* is "Sum of Energy Use" and the time dimension 1006*b* is "Date"; for metric 1010 "Partner Pay gap", and the aggregate measure 1010*a* is "Maximum(Pay)–"Minimum(Pay)" and the time dimension 1010*b* is "Review Data."

In some embodiments, the suggested metrics 1002 are all saved in the metrics database 912 in response to user input 1014 selecting button 1012 for saving/storing selected metrics in the list of suggested metrics 1002.

FIG. 11 illustrates user interface 200 for viewing and creating metrics that displays newly created metrics using machine learning model. After all suggested metrics 1002 are saved or stored, the newly generated metrics appear user interface 200 for viewing and creating metrics. The newly created metrics are tagged as such so that the user can recognize which metrics have been recently added. For example, metric 1004 "Partner Happiness Score", metric 1006 "Scope 1 Emissions", metric 1008 "Renewable Energy Usage", and metric 1010 "Partner Pay Gap" are all tagged as in new in user interface 200.

Figure 14:
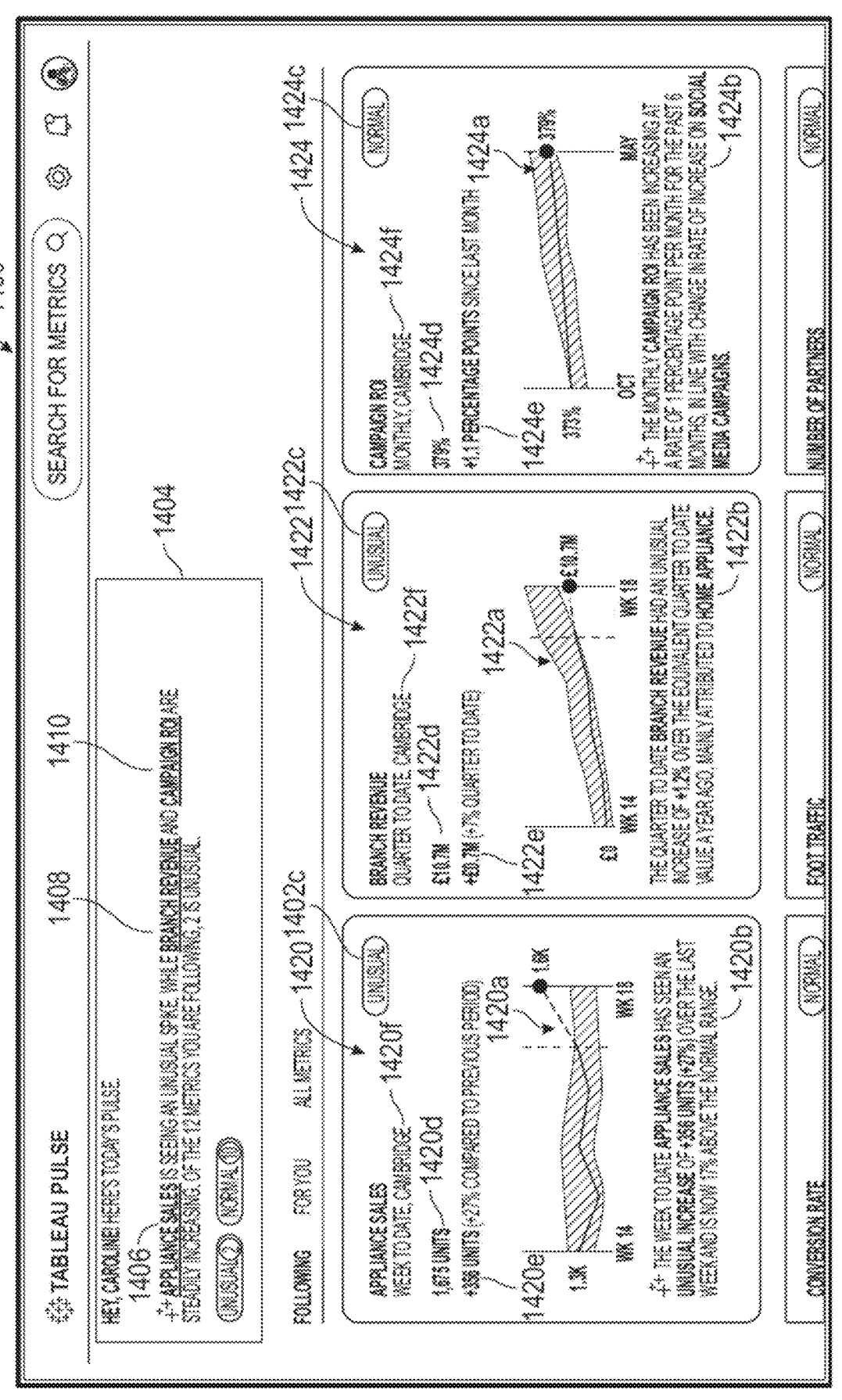
FIG. 14 illustrates a summary of a bundle of insights for multiple metrics, in accordance with some embodiments.

In some embodiments, various metrics can be built based on the same metric definitions. In some embodiments, a user can subtribe to or follow multiple metrics. In some embodiments, metrics cards are displayed in a user interface (e.g., a user interface in a web browser application, a desktop application, or a mobile application) for metrics and insights. In some embodiments, metric cards include (i) a value of an aggregated measure of the respective metric; (ii) a data visualization (e.g., a line chart) that visualizes the respective aggregated metric; and (iii) an insight based on the aggregated metric that includes to a textual description of the aggregated metrics. In some embodiments, metric cards (metric cards 1420, 1422, and 1424) are illustrated in FIG. 14.

In some embodiments, a data model can represent relationship between the metrics. Examples of relationships between the metrics include, but are not limited to, "a leading indicator relationship" (e.g., one metric being a leading indicator for a change in another metric); a "lagging indicator relationship" (e.g., one metric being a lagging indicator for a change in another metric); "a positive influencer relationship" (e.g., one metric being a positive influencer for a change in another metric); "a negative influencer relationship" (e.g., one metric being a negative influence for a change in another metric); a "component of" relationship. In some embodiments, the machine learning model is trained on metrics and various relationships that exist between the metrics. In some embodiments, an output of the machine learning model includes a list of tuples, each corresponding to a Relationship that likely holds between two of the metrics. In some embodiments, each tuple is in a format of (Metric, Relationship Type, Metric), e.g., (Open Pipeline, Leading Indicator, Revenue). In some embodiments, an insight generator module can generate insights based on relationships between the metrics (e.g., based on a data model of the relationships between metrics). In some embodiments, a data model of the relationships can be stored in metrics database (e.g., metrics database 808) or a different database to which metrics service 812 has access to.

In some embodiments, the following description provide examples of different type of metric relationships. The format that is used to describe the type of relationships is: "Metric [relationship type] Target Measure or Dimension."

(1) "Metric [relates to] Time Dimension." This relationship is used to generate time-based insights (e.g., jump, spike, change in trend, seasonality). For example, "Sales [relates to] Order Date Dimension."

(2) "Metric [relates to] Flat categorical dimension." This relationship is used when the dimension is a non-hierarchical, text based/non-numeric) dimension. For example, "Hires [relates to] Gender."

(3) "Metric [relates to] Hierarchical dimension (parent child or Level based)." This relationship represents that a metric is related to a hierarchical dimension. In some embodiments, the hierarchy can be based on a parent-child relationship (e.g., Organization, Department, or Cost Center) or it can be level-based (e.g., Location or product hierarchy). For example, "Hires [related to] Departmental Hierarchy," or "Revenue [relates to] Product Hierarchy." Example insights (e.g., answers to business questions) that can be based on this relationship includes (i) Peer level insights (e.g., the diversity ratio for your department is higher than your peers), and (ii) parent-child level contribution insights (e.g., Revenue for the sporting goods product category was largely driven by the snowboards, e-bikes and scooters products).

(4) "Metric A [comparable to] Metric B (metric, benchmark, or goal)." This relationship is used to compare one metric to another metric, benchmark, or goal. Different insights can be based on this relationship, e.g., insights around variance, or progress to goal or benchmark. This relationship can be used when new metrics or plans are loaded from an external system. Examples of this relationship include "Headcount [Comparable to] Headcount Goal", or "Diversity Ratio [compares to] EEOC." Example insights (e.g., answers to business questions) that can be based on this relationship includes (i) Metric Progress to Plan insights (e.g., Headcount is currently not tracking to the Headcount Plan); and (ii) Benchmark or Metric comparison insights (e.g., the diversity ratio for the Engineering department is 5 pp higher than the EEOC benchmark).

(5) "Metric A [leading/lagging indicator to] Metric B." This relationship can be used when one metric is a leading or lagging indicator of another metric. This relationship can be used to create cross-metric insights that, for example, provide indication (e.g., in advance) that a metric a user is subscribed to is likely going to be impacted. An example insight (e.g., answers to business questions) that can be based on this relationship is: Leading Metric Insights (e.g., the trend of Time Since Promotion is increasing and as a result may have an impact on Exit rate).

(6) "Metric A [parent stage to] Metric B." This relationship can be used to generate Funnel Insights. In some embodiments, modeling a funnel as a sequence of stages along with key metrics at each stage allow the detection of several funnel/pipeline related insights. An example of this relationship is: in a 5 stage sales funnel, #Prospects [parent stage to] #MQL [parent stage to] #SQL [Parent stage to] #Opportunities [parent to] #customer. Example insights (e.g., answers to business questions) that can be based on this relationship includes (i) Stage conversion questions (e.g., the MQL/SQL conversion ratio is 35% this week & trending down); (ii) Stage entry, abandonment questions (e.g., 37% of SQL entered the funnel at the SQL stage); and (iii) Funnel forecast questions (e.g., based on the current recruiting pipeline Hires is forecasted to be 245 in Q4).

(7) "Metric A [included in Formula of] Metric B." This relationship is used when one metric is referenced in the formula of another metric. For example, the metrics Sales and Expenses are included in the formula for calculating the metric Profit (e.g., Profit=Sales–Expenses), or the metrics Headcount, Hires, and Exits are included in the formula for calculating the metric Net Headcount.

(8) "Metric A [parent to] Metric B." This relationship is used in cases where several SUM metrics are modeled together in a hierarchy that rolls up in financial cases (for example the different metrics in a general ledger." This relationship can be used to generate contribution insights. Example insight that can be based on this relationship is "Total cost of Workforce [parent of] Benefits|Salaries & Office Space metrics and Office Overhead which is a [Parent of] Rent|Insurance|equipment)."

(9) "Metric A [correlated positively/negatively to] Metric B." This relationship is used to represent a case where one metric is correlated to another metric, and also represent how the two metrics are correlated (e.g., positively or negatively). In some embodiments, some correlation relationships are blacklisted. For example, correlations that are obvious (e.g., profits being correlated to revenue) as such correlations provide minimal insight. Example insights include (i) higher app usage leads to more up-sells; (2) a lead's score is not predictive of its pipeline value; and (iii) individual who have managers that are highly rated take fewer sick days.

(10) "Metric [relates to] Geo Hierarchy." This relationship represents a relationship between a metric and geo (or location) hierarchy dimension. Business questions related to time or location are common. An example insight is "Hires [related to] Location Geo Hierarchy."

In some embodiments, relationships can be modeled manually. In some embodiments, relationships can be built by a user using templates (e.g., a package of relationship for a respective domain). In some embodiments, the user can map metrics and dimensions of a selected data source to metric definitions and templated relationships (e.g., in the package). In some embodiments, the relationships can be detected and suggested automatically by an insights service. For example, for a selected metric, the insights service inspects the data source and returns possible relationships of the selected metric to other measures and dimensions in the data source using statistics. In some embodiments, modeling metric relationships can be bootstrapped using a service that scrapes key measures, dimensions and their relationships from existing views of data in existing dashboards, and imports the same as modeled relationships in the metrics layer. In some embodiments, as part of the import workflow, user can select/de-select different mappings and relationships.

FIG. 12 illustrates a process 1200 for automatically generating metric objects. A plurality of data fields are obtained (1204) from a selected data source. A first subset of the plurality of data fields correspond to a plurality of measures and a second subset of the plurality of data fields correspond to a plurality of dimensions. In some embodiments, a user (e.g., analytics professional or a business user) selects a data source. In some embodiments, a metrics service automatically scans for available data sources. In some embodiments, some data fields in the obtained plurality of data fields are measures and some are dimensions.

A machine learning model is prompted (1206) to generate a plurality of suggested metric objects. In some embodiments, a metric service may prompt (or send a request) to the machine learning model requesting that the machine learning model suggests metric objects. In some embodiments, the metric service may generate and send the prompt in response to a user input or an automatically generated request from a computer system. In some embodiments, the machine learning model is a large language model, such as a generative pre-trained transformer. In some embodiments, the machine learning model is trained on a data source that already includes metadata and/or semantics that have been pre-configured or predetermined by a user (e.g., a data analyst or other user that has domain knowledge). In some embodiments, examples of such semantics and/or metadata data include, but are not limited to, columns that are labeled as measures; names or labels for the measures; usage of the measures across different workbooks, including labels or descriptions of those workbooks (e.g., the measure Sales have been used in a workbook described or labeled as Sales over time), pre-existing aggregations of the measures, calculations in which the measures were used, and/or breaking down of the measures by different dimensions; formatting, styling, and/or visual encodings associated with the measures; data visualizations in which the measures have been used. In some embodiments, such semantics and/or metadata in the data source provide domain specific knowledge on which the machine learning model is trained. In some embodiments, in addition to training the machine learning model, such semantics and/or metadata are provided to the machine learning model from the selected data source in the prompt request (e.g., provided as input to the machine learning model).

In response to prompting the machine learning model, a respective metric definition is generated (1208) for each measure in the plurality of measures, wherein each generated respective metric definition includes a plurality of data fields, including: (i) a name (e.g., a metric label or a textual description of a metric, such as "Delivery Time," "Resource Utilization," "Average of Partner Happiness," "Sum of Emissions," "Sum of Energy Use," "Partner PayGap," "Appliance Sales," "Branch Revenue," "Campaign ROI," and/or other textual description of a respective metric); (ii) a measure; (iii) a time dimension; and (iv) an aggregation type (e.g., SUM, AVG, MAX, MIN, Median, Percentile, Standard Deviation, COUNT). In some embodiments, the measure corresponds to a data field in the data source, such as a column in a relational database table (e.g., Revenue, Expenses, or other measures depending on the data source). For example, the measure is already existing and stored in the data source. In some embodiments, the measure may be a calculated measure. For example, a data field maybe created using a calculation optionally from other already existing or calculated measures (e.g., Revenue-Expenses to calculate a Profit measure). In some embodiments, a metric service sends a prompt to the machine learning model requesting a metric definition for each identified data field in the data source that corresponds to a measure. In some embodiments, the time dimension corresponds to a data field in the data source that includes date and/or time (e.g., order date) by which the measure is aggregated.

In some embodiments, metric objects are defined by the respective metric definition. In some embodiments, metric objects (also referred to as metrics) are analytical objects that can be used in data analysis and/or business intelligence tools. In some embodiments, metrics can be used in informational snippets referred to as insights that provide contextual (and optionally personalized) information for a respective matric, including optionally information about performance of the metric in relation to other metrics and/or across different dimensions.

In some embodiments, metric objects are entities that are subject to analysis, e.g., to gain insights about data and/or make informed decisions. In some embodiments, metric objects can be generated manually. For example, a user can select a measure, time dimension, an aggregation type, name, and/or other fields that are included in a definition of a metric. In some embodiments, some data fields of a metric definition can be manually generated while others can be bootstrapped or otherwise generated automatically by using the machine learning model. In some embodiments, a plurality of metrics are predefined (e.g., templates with preset metric definitions). In some embodiments, the metrics definitions are stored in a database, and a metric service retrieves, changes, and/or adds to the stored metrics.

In some embodiments, some of the plurality of fields can be provided by a user and a remainder of the data fields can be generated or suggested by the machine learning model (e.g., on the fly). In some embodiments, the plurality of data fields that are generated and/or suggested by the machine learning model can be validated by a user or another machine learning model. In some embodiments, the machine learning model can generate personalized metric definitions based on metadata and/or usage of the measures by a respective user.

In some embodiments, the plurality of data fields include (1210) additional contextual fields, including one or more related dimensions. For example, candidate dimensions by which the measure can be analyzed meaningfully (e.g., the measure Revenue can be meaningfully analyzed by the dimensions Region and Product, where analyzing Revenue by Order Id is not helpful). In some embodiments, the one or more related dimensions are predicted by the machine learning mode to likely be useful for breaking down or filtering the metric. In some embodiments, a threshold number of dimensions can be included in a metric definition (e.g., no more than five dimensions may be returned by the machine learning model). In some embodiments, one or more related dimensions can be selected (e.g., inferred) and/or generated by the machine learning model or by a user. In some embodiments, a metric that has dimensions associated with it is referred to as a scoped metric.

The plurality of data fields include (1212) additional contextual fields, including time granularity. In some embodiments, different time granularities are appropriate for the respective aggregation of the measure associated with the generated metric. For example, the measure can be aggregated by an hour, a day, a week, a month, last then days, last 30 days, last 6 months, or any other time frame that is suitable for the respective measure aggregation. For example, sales maybe be aggregated for the day, or depending on the data in the data sources, sales should not be aggregated across less than a week time frame. In some embodiments, time granularity can be selected and/or generated by the machine learning model or by a user. In some embodiments, a metric that has time granularity associated with it is referred to as a scoped metric.

In some embodiments, the plurality of data fields includes (1214) additional contextual fields, including a favorability indicator. In some embodiments, the machine learning model generates, infers, or suggests a favorability indicator related to performance of the respective measure. For example, if a value of the aggregated measure is going up (e.g., historically or over specified comparative time frames), the machine learning model can infer if such a change is positive (e.g., good), negative (e.g., bad), or neutral; if the change is normal or unusual. The favorability indicator controls contextual information related to the metric such as color (e.g., red to indicate negative change, green to indicate positive change, and a neutral color such as blue or grey to indicate a neutral change); and language that can be used to describe the metric in digests and/or insights (e.g., "Sales improved . . . " for a positive change vs. "Sales increased . . . " for a neutral change). In some embodiments, additional contextual fields that the machine learning model can generate or infer include a description of the metric in natural language (e.g., a sentence-long description of the metric in natural language, e.g., description for a non-technical person) and/or formatting or appropriate styling for the measure.

In some embodiments, the machine learning model is (1216) a generative artificial intelligence model. In some embodiments, the generative artificial intelligence model can generate textual description for the metric (e.g., based on the respective metric, and data and other data fields in the data source).

In some embodiments, the machine learning model that is used to generate the metric definition is a first machine learning model, and the metric definitions generated by the first machine learning model are validated (1218) using a second machine learning model In some embodiments, one or more suggested metric objects are displayed (1220) in a user interface, where each suggested metric objects is based on a respective metric definition generated by the machine learning model. For each of the one or more suggested metric objects, an option for selecting a respective suggested metric object to be saved in a metrics database that includes other metric objects is displayed is displayed in the user interface.

Figure 13:
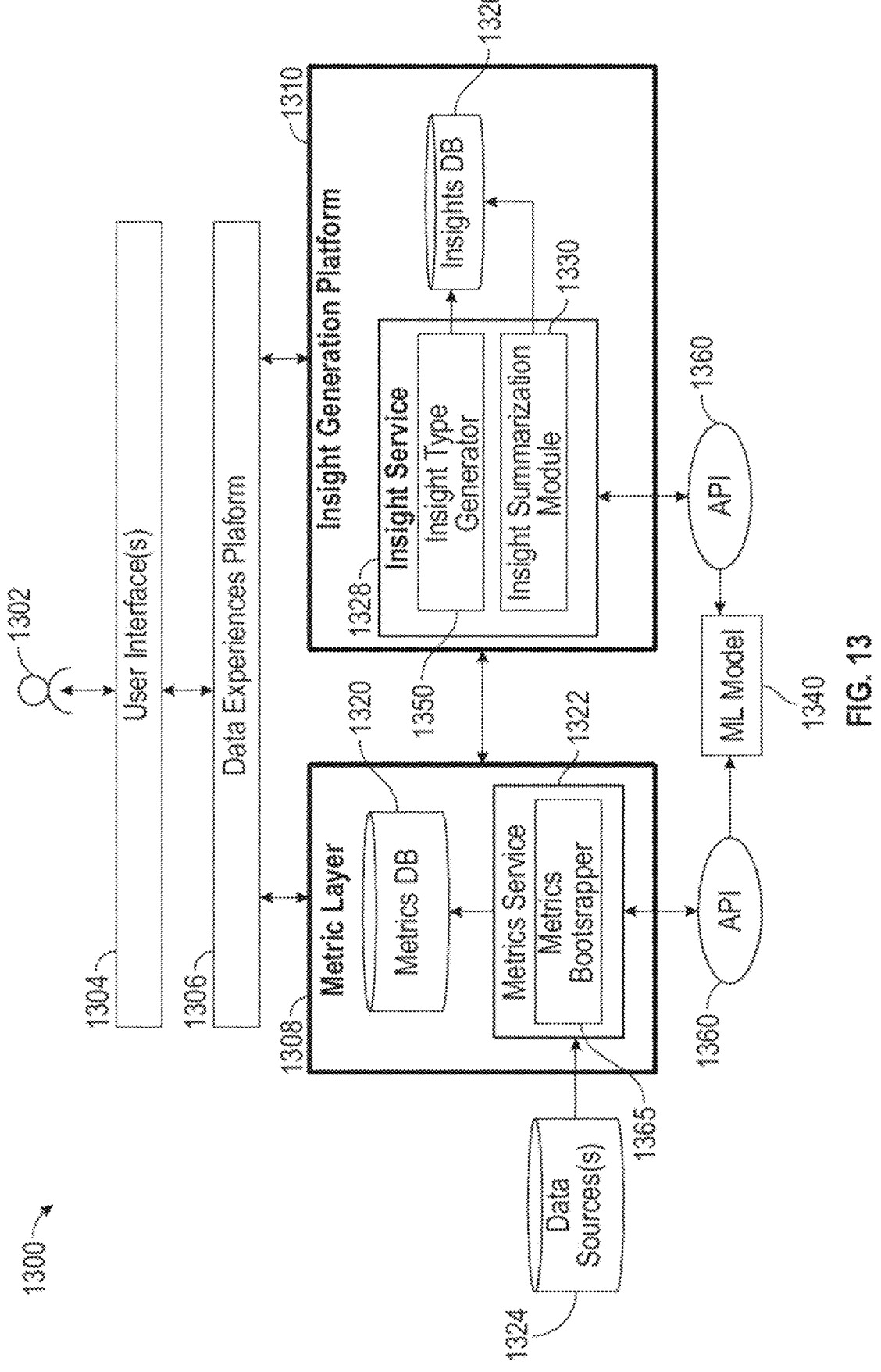
FIG. 13 illustrates a schematic system for automatically generating insight summaries using machine learning model, in accordance with some embodiments.

FIG. 13 illustrates a schematic system 1300 for automatically generating insight summaries using machine learning model 1340, in accordance with some embodiments. In some embodiments, insight generation platform 1310 is conceptually a layer on top of the metric layer 1308, and both have access (direct or indirect) to data sources(s) 1324 (e.g., data sources 814*a* and 814*b* in FIG. 8). In some embodiments, metric layer 1308 corresponds to metric layer 806, the metrics service 1322 corresponds to metrics service 812, and metrics database 1320 corresponds to metric database 808, described in further detail with reference to FIG. 8. Metric bootstrapper 1365 is a module (e.g., a program) for generating metrics using machine learning model 1340 (e.g., in response user input, or autonomously without additional user input) via application programming interface (API) 1360 (e.g., API 1360 corresponds to API 810 in FIG. 9). In some embodiments, metric bootstrapper 1365 automatically generates metrics using the machine learning model 1340 in accordance with process 900 (described in relation to FIG. 8) and process 1200 (described in relation to FIG. 12).

In some embodiments, metric definitions are created manually (e.g., by a business analyst) or automatically (e.g., by metric bootstrapper 1365) and stored in metrics database 1320. An example metric definition for a sales metric has one or more values for each respective data field in the metric definition, such as (i) name: Sales; (ii) measure: SUM(Order_Value); (iii) Definitional Filters: "where Order_Value>$100"; (iv) Time Dimension: Order_Closed_Date; (v) Dimensional Filter(s): Region, Product Category, and Sales Channel; (vi) Time Granularities: weekly, monthly, quarterly. In some embodiments, the metric definitions can be scoped by a user by selecting values for some additional contextual fields. For example, for the sales metric described above, a user can specify additional filters and/or specific values for fields that have more than one value. For example, a user can filter the aggregated sales metric by Region (e.g. Region=="East"); specify that the time granularity is "weekly"; and specify a time comparison: "previous period."

In some embodiments, insight generation platform 1310 includes insight service 1328 and insights database 1326. In some embodiments, insight service 1328 generates insights for selected metrics (e.g., a metric selected from the metrics database 1320). In some embodiments, insights are natural language expressions that explain or provide description of changes (or other information) related to a selected metric that are occurring in a respective (e.g., selected) data source (e.g., performance of an aggregated metric for a specific time frame, and/or across different dimensions). In some embodiments, the insight type generator 1350 receives as input scoped metrics (e.g., the insight service 1328 provides the metrics scoped by the user to the insight type generator 1350). In some embodiments, the insight type generator 1350 generates one or more different types of insights for the scoped metric using one or more different insight type templates (e.g., stored in insights database 1326). For example, insight generator 1350 can generate a Top Drivers insight for the Sales metric, where the Top Drivers insight provides information about which dimension is the main cause (e.g., or top driver) for the changes occurring for the aggregated measure in the Sales metric. To determine a top driver, the insight type generator 1350 calculates, for each dimension member (i) the contribution amount for a previous time range; and (ii) the contribution amount for a starting time range. It then determines the amount of change driven/explained by calculating the difference in contribution. An example template is: "During the last [scope]: [metric_name] increased by [−/+percent]. [Dimension]_member_list] increased the most," and example insight based on that Top Driver template is: "During the last period, Sales increased by $365K. ePhones, Simpson Phones, and Smart Home increased the most."

In some embodiments, the generated insights are stored in insights database 1326. In some embodiments, various types of insight templates are stored in an insights database. Example types of insights include "Profit Changed" Insight (e.g., with respective associated metric being Profit); a "Revenue changed" Insight; Top Driver Insight, and other types. Example insights that are generated based on the data in the data source and respective insight templates include, but are not limited to, "Gross margin is 14.4% greater than last month;" "Delivery Day increased by 5.6% compared to the same time last month;" and other natural language descriptions of the performance of a respective aggregated measure associated with a respective metric.

In some embodiments, a collection of insights, each generated for a metric of a set of selected metrics (e.g., metrics that the user is following) are stored using a data structure that is referred to as a bundle (e.g., bundles are optionally stored in insights database 1326). In some embodiments, a bundle is a collection of insights (e.g., optionally generated using templates) for multiple metrics to which a respective user is subscribed to or is following. In some embodiments, bundles are predefined or created dynamically. For example, a "Metric Change" bundle can contain a first insight about a metric that changed and a second insight that explains the change. Examples of bundles include, but are not limited to, "The week to date Appliance Sales has seen an unusual increase of +356 (+27%) over the last week and is now 17% above the normal range"; "The quarter to date Branch Revenue had an unusual increase of +1.2% over the equivalent quarter to date value a year ago, mainly attributed to Home Appliance"; and/or "The monthly Campaign ROI has been increasing at a rate of 1 percentage point per month for the past 6 months, in line with change in rate of increase on Social Media campaigns." In some embodiments, a bundle can include relationships between insights included in the bundle. For example, bundles can define or include semantic relationships between the insights included in the bundle. In some embodiments, the semantic relationships can be expressed with text. For example, a bundle may contain a "Profit Changed" Insight and a "Revenue changed" Insight, with a "caused by" Relationship between the two insights to capture a business insight, such as "Profit rose, driven by an increase in revenue." The templated output of a bundle can include that relationship, e.g., "Profit rose 15%. This was caused by: Revenue rose 18%".

In some embodiments, a bundle of insights is generated by insight type generator 1350 and stored in insights database 1326. In some embodiments, the bundle of insights is provided to insight summarization module 1330 to generate a summary of insights for all metrics that a user is following. The insight summarization module 1330 provides the bundle of insights as input to machine learning model 1340 optionally using application programming interface (API) 1360. In some embodiments, the machine learning model 1340 is used by metrics bootstrapper 1332 to automatically generate metric definitions, and by insights summarization module 1330 to summarize all insights in a respective bundle of insights (e.g., for all metrics a user is following). In some embodiments, metrics bootstrapper 1365 and insights summarization module 1330 use different machine learning models. In some embodiments, insight summarization module 1330 ranks respective insights included in the bundle of insights according to relevancy of respective metrics associated with the respective insights, and provides the ranked insights in the bundle as input to the machine learning model 1340. The insight summarization module 1330 generates a summary of the bundle of insights using the machine learning model 1340. In some embodiments, the insight summarization module 1330 validates the summary of the bundle of insights using regular expression and heuristics, or using a second machine learning model. In some embodiments, the summary of the bundle of insights includes a natural language expression describing top insights included in the bundle for metrics, which the user is following. For example, a summary can be: "Sales is seeing unusual spike since the beginning of this week, while quarterly Regional Revenue and monthly Campaign ROI are steadily increasing. Additionally, 7 out of 12 other metrics have changed, 4 favorably and 3 unfavourably."

In some embodiments, validating accuracy of the first summary of the bundle insights includes comparing a respective aggregated measure included in a respective insight in the bundle of insights to a respective aggregated measure included in the summary and determines if there any changes in the respective aggregated measure. For example, a insight summarization model determines whether an aggregated measure in the summary is the same as a respective aggregated measure in the original insight.

In some embodiments, selectable business questions can be generated and displayed for a user 1302 in user interface(s) 1304 via data experiences platform 1306.

In some embodiments, a summary of the insights is provided in user interface(s) 1304 via data experiences platform 1306.

FIG. 14 illustrates a user interface 1400 that includes a summary 1404 of insights related to metrics to which a user is following, in accordance with some embodiments. The summary 1404 informs the user of the following: "Appliance Sales is seeing an unusual spike, while Branch Revenue and Campaign ROI are steadily increasing. Of the 12 metrics you are following, 2 is unusual." The top metrics in summary 1404 include "Appliance Sales" 1406, "Branch Revenue" 1408, and "Campaign ROI" 1410. In some embodiments, a user can hover over each of the underlying metrics to obtain additional information and/or insights about the respective metric (e.g., in a pop-up window). In some embodiments, below the summary 1404, a user can see metrics cards 1420, 1422, and 1424 for each of the top metrics "Appliance Sales" 1406, "Branch Revenue" 1408, and "Campaign ROI" 1410. For example, metric card 1420 provides information related to the metric "Appliance Sales" 1406, including a data visualization 1420*a*, the calculated measure 1420*d* which corresponds to the amount of appliances sales (e.g., 1,675 units), the amount of change 1420*e* compared to a previous period (e.g., +365 units (+27% compared to a previous period)); and the time dimension and/or other selected filters 1420*f* (e.g. Week to date, Cambridge); and insight 1420*b* that states "The week to date Appliance Sales has seen an unusual increase of +356 (+27%) over the last week and is now 17% above the normal range." Metrics card 1420 further includes an indicator 1420*c* for whether the change is usual or unusual. The colors for the indicators are selected based on the favorability indicator in the metric definition for the metric "Appliance Sales" 1406.

User interface 1400 further includes metric card 1422 for the metric "Branch Revenue" 1408, which provides data and/or information related metric "Branch Revenue" 1408, including a data visualization 1422*a*, the calculated measure 1422*d*, which corresponds to the amount of Branch Revenue (e.g., 10.7M pounds), the amount of change 1422*e* compared to a previous period (e.g., +0.7 M pounds (+7% quarter to date)); and the time dimension and/or other selected filters 1422*f* (e.g. Quarter to date, Cambridge); and insight 1422*b* that states: "The quarter to date Branch Revenue had an unusual increase of +1.2% over the equivalent quarter to date value a year ago, mainly attributed to Home Appliance."

User interface 1400 further includes metric card 1424 for the metric "Campaign ROI" 1410, which provides data and/or information related to the metric "Campaign ROI" 1410, including a data visualization 1424*a*, the calculated measure 1424*d* which corresponds to the amount of Campaign ROI (e.g., 379%), the amount of change 1424*e* compared to a previous period (e.g., +1.1 percentage points since last month); the time dimension and/or other selected filters 1424*f* (e.g. Monthly, Cambridge); and insight 1424*b* that states: "The monthly Campaign ROI has been increasing at a rate of 1 percentage point per month for the past 6 months, in line with change in rate of increase on Social Media campaigns."

In some embodiments, summary 1404 includes summaries of insights 1420*b*, 1422*b*, and 1424*b*. In some embodiments, the metric cards include indicators that specify how normal or unusual the metric data is currently (e.g., indicators 1420*c*, 1422*c*, and 1424*c*, which are also color coded to identify the extent of unusual data).

FIG. 15 is a flowchart diagram of a process 1500 for generating and validating data insights using machine learning models, in accordance with some embodiments. A bundle of insights generated based on insight templates is obtained (1504). In some embodiments, metrics (optionally including scoped metrics) are associated with respective insights. In some embodiments, an insight is generated for a respective aggregated measure in a respective metric. In some embodiments, for each metric, there is one insight displayed in a metric object (e.g., a metric card displayed in a user interface). In some embodiments, insights are natural language expressions that explain or provide descriptions of changes related to a selected metric that are occurring in a respective (e.g., selected) data source. In some embodiments, insights are created using templates. In some embodiments, various types of insight templates are stored in an insights database. Example types of insights include "Profit Changed" insights (e.g., with respective associated metric being Profit) and a "Revenue changed" insights. Example insights that are generated based on the data in the data source and respective insight templates include, but are not limited to, "Gross margin is 14.4% greater than last month;" "Delivery Day increased by 5.6% compared to the same time last month;" and other natural language description of the performance of a respective aggregated measure associated with a respective metric. In some embodiments, a collection of insights is stored (e.g., in an insights database) using a data structure that is referred to as a bundle. In some embodiments, a bundle is a collection of insights (e.g., optionally generated using templates) for multiple metrics to which a respective user is subscribed to or is following. In some embodiments, bundles are predefined or created dynamically. For example, a "Metric Change" bundle can contain a first insight about a metric that changed and a second insight that explains the change. Examples of bundles include, but are not limited to, "The week to date Appliance Sales has seen an unusual increase of +356 (+27%) over the last week and is now 17% above the normal range"; "The quarter to date Branch Revenue had an unusual increase of +1.2% over the equivalent quarter to date value a year ago, mainly attributed to Home Appliance"; and/or "The monthly Campaign ROI has been increasing at a rate of 1 percentage point per month for the past 6 months, in line with change in rate of increase on Social Media campaigns." In some embodiments, a bundle can be defined or generated "on the fly" or implicitly. For example, a bundle can be implicitly created as the user explores or interacts with the metric and associated insights. In some embodiments, a bundle includes relationships between insights included in the bundle. For example, bundles can define or include semantic relationships between the insights included in the bundle. In some embodiments, the semantic relationships can be expressed with text. For example, a bundle may contain a "Profit Changed" insight and a "Revenue changed" insight, with a "caused by" Relationship between the two insights to capture a business insight, such as "Profit rose, driven by an increase in revenue." The templated output of a bundle can include that relationship, such as "Profit rose 15%. This was caused by: Revenue rose 18%".

The bundle of insights is provided (1506) as input to a machine learning model. In some embodiments, the machine learning model is large language processing model. In some embodiments, the machine learning model is trained on insights generated using templates (e.g., created by an analytics professional or other users skilled in data analytics) for different data sources. In some embodiments, the machine learning model is a generative pre-trained transformer. In some embodiments, the machine learning model is trained on a data source that already includes metadata and/or semantics that have been pre-configured or predetermined by a user (e.g., a data analyst or other user that has domain knowledge). In some embodiments, examples of such semantics and/or metadata data include, but are not limited to, columns that are labeled as measures; names or labels for the measures; usage of the measures across different workbooks, including labels or descriptions of those workbooks (e.g., the measure Sales have been used in a workbook described or labeled as Sales over time), pre-existing aggregations of the measures, calculations in which the measures were used, and/or breaking down of the measures by different dimensions; formatting, styling, and/ or visual encodings associated with the measures; data visualizations in which the measures have been used. In some embodiments, such semantics and/or metadata in the data source provide domain specific knowledge on which the machine learning model is trained.

A summary of the bundle of insights is generated (1508) using the machine learning model (e.g., the machine learning model 1340 in FIG. 13). In some embodiments, the bundle includes a single insight. In such case, the summary of the bundle improves the templated language in bundle expression using the machine learning model.

In some embodiments, the summary of the bundle (e.g., summary 1400 in FIG. 14) of insights corresponds to (1510) a natural language expression describing respective insights and relationships between the respective insights in the bundle.

In some embodiments, generating the summary of the bundle of insights includes (1512): generating a first summary of the bundle of insights using the machine learning model; validating accuracy of the first summary of the bundle insights, including identifying one or more inaccuracies; and generating a second summary of the bundle of insights correcting the identified one or more inaccuracies.

In some embodiments, validating accuracy of the first summary of the bundle insights is performed (1514) using regular expressions and heuristics. In some embodiments, validating accuracy of the first summary of the bundle insights includes comparing a respective aggregated measure included in a respective insight in the bundle of insights to a respective aggregated measure included in the summary and determines if there any changes in the respective aggregated measure. For example, an insight summarization model (e.g., insight summarization module 1330 in FIG. 13) determines whether an aggerated measure in the summary is the same as a respective aggregated measure in the original insight.

In some embodiments, the machine learning model used to generate the summary of the bundle insights is (1516) a first machine learning model, and validating accuracy of the first summary of the bundle insights is performed using a second machine learning model.

In some embodiments, the process 1500 further includes (1518): ranking respective insights in the bundle of insights according to relevancy of respective metrics associated with the respective insights; and providing the ranker insights in the bundle as input to the machine learning model includes providing the ranking of the respective insights in the bundle.

In some embodiments, at least some metrics that are associated with respective insights in the bundle of insights have (1520) predetermined relationships to other metrics stored in a metrics database.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for generating insight summaries, including:
   receiving a natural language expression describing respective insights and relationships between the respective insights in a bundle;
   obtaining the bundle of the respective insights generated based on insight templates;
   ranking the respective insights in the bundle of insights according to relevancy of respective metrics associated with the respective insights;
   providing the ranked insights in the bundle as input to a machine learning model;
   generating a first summary of the bundle of insights using the machine learning model that is trained based on semantics derived from corpuses and metadata derived from labelled data;
   validating accuracy of the first summary of the bundle of insights using the machine learning model, including identifying one or more inaccuracies; and
   generating, using the machine learning model, a second summary of the bundle of insights correcting the identified one or more inaccuracies.

2. The method of claim 1, further comprising validating the accuracy of the first summary of the bundle of insights using regular expressions and heuristics.

3. The method of claim 1, wherein the machine learning model includes a first machine learning model that is used to generate the first summary of the bundle of insights and a second machine learning model that is used to validate the accuracy of the first summary of the bundle of insights.

4. The method of claim 1, wherein at least some metrics that are associated with the respective insights in the bundle of insights have predetermined relationships to other metrics stored in a metrics database.

5. A computer system having one or more processors and memory, wherein the memory stores one or more programs configured for execution by the one or more processors, and the one or more programs comprise instructions for:
   receiving a natural language expression describing respective insights and relationships between the respective insights in a bundle;
   obtaining the bundle of the respective insights generated based on insight templates;
   ranking the respective insights in the bundle of insights according to relevancy of respective metrics associated with the respective insights;
   providing the ranked insights in the bundle as input to a machine learning model;
   generating a first summary of the bundle of insights using the machine learning model that is trained based on semantics derived from corpuses and metadata derived from labelled data;

validating accuracy of the first summary of the bundle of insights using the machine learning model, including identifying one or more inaccuracies; and generating, using the machine learning model, a second summary of the bundle of insights correcting the identified one or more inaccuracies.

6. The computer system of claim 5, wherein the one or more programs further comprise instructions for validating the accuracy of the first summary of the bundle of insights using regular expressions and heuristics.

7. The computer system of claim 5, wherein the machine learning model includes a first machine learning model that is used to generate the first summary of the bundle of insights and a second machine learning model that is used to validate the accuracy of the first summary of the bundle of insights.

8. A non-transitory computer readable storage medium storing one or more programs configured for execution by a computer system having one or more processors and memory, the one or more programs comprising instructions for:

receiving a natural language expression describing respective insights and relationships between the respective insights in a bundle;

obtaining the bundle of the respective insights generated based on insight templates;

ranking the respective insights in the bundle of insights according to relevancy of respective metrics associated with the respective insights;

providing the ranked insights in the bundle as input to a machine learning model;

generating a first summary of the bundle of insights using the machine learning model that is trained based on semantics derived from corpuses and metadata derived from labelled data;

validating accuracy of the first summary of the bundle of insights using the machine learning model, including identifying one or more inaccuracies; and generating, using the machine learning model, a second summary of the bundle of insights correcting the identified one or more inaccuracies.

9. The non-transitory computer readable storage medium of claim 8, the one or more programs comprising instructions for validating the accuracy of the first summary of the bundle of insights using regular expressions and heuristics.

10. The non-transitory computer readable storage medium of claim 8, wherein the machine learning model includes a first machine learning model that is used to generate the first summary of the bundle of insights and a second machine learning model that is used to validate the accuracy of the first summary of the bundle of insights.

11. The computer system of claim 5, wherein at least some metrics that are associated with the respective insights in the bundle of insights have predetermined relationships to other metrics stored in a metrics database.

12. The non-transitory computer readable storage medium of claim 8, wherein at least some metrics that are associated with the respective insights in the bundle of insights have predetermined relationships to other metrics stored in a metrics database.

* * * * *